US011639909B2

(12) United States Patent
Shevate et al.

(10) Patent No.: US 11,639,909 B2
(45) Date of Patent: May 2, 2023

(54) COMPOSITE MATERIALS FOR SENSING APPLICATIONS

(71) Applicant: King Abdullah University of Science and Technology, Thuwal (SA)

(72) Inventors: Rahul Hanumant Shevate, Thuwal (SA); Md Azimul Haque, Thuwal (SA); Klaus-Viktor Peinemann, Thuwal (SA); Tao Wu, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 182 days.

(21) Appl. No.: 16/769,703

(22) PCT Filed: Nov. 27, 2018

(86) PCT No.: PCT/IB2018/059365
§ 371 (c)(1),
(2) Date: Jun. 4, 2020

(87) PCT Pub. No.: WO2019/111101
PCT Pub. Date: Jun. 13, 2019

(65) Prior Publication Data
US 2020/0386703 A1 Dec. 10, 2020

Related U.S. Application Data

(60) Provisional application No. 62/742,542, filed on Oct. 8, 2018, provisional application No. 62/595,812, filed on Dec. 7, 2017.

(51) Int. Cl.
*G01N 27/12* (2006.01)
*C08K 3/04* (2006.01)
*C08J 5/18* (2006.01)

(52) U.S. Cl.
CPC .............. *G01N 27/127* (2013.01); *C08J 5/18* (2013.01); *C08K 3/041* (2017.05); *G01N 27/121* (2013.01);
(Continued)

(58) Field of Classification Search
CPC ......... C08J 2353/00; C08J 5/18; B82Y 15/00; C08K 2201/001; C08K 2201/011;
(Continued)

(56) References Cited

U.S. PATENT DOCUMENTS 9,527,041 B2 * 12/2016 Wiesner .................. C08L 53/00
2012/0318741 A1 12/2012 Peinemann et al.
(Continued)

OTHER PUBLICATIONS

Arnold, et al., "Sorting Carbon Nanotubes by Electronic Structure Using Density Differentiation", Nature Nanotechnology, vol. 1, Oct. 2006, pp. 60-65.
(Continued)

*Primary Examiner* — Mark Kopec
*Assistant Examiner* — Jaison P Thomas
(74) *Attorney, Agent, or Firm* — Billion & Armitage

(57) ABSTRACT

Embodiments of the present disclosure describe sensors and sensing applications based on a composite material comprising an isoporous block copolymer film and a plurality of carbon nanoparticles embedded in the isoporous block copolymer film. Embodiments of the present disclosure further describe composite materials, methods of fabricating the composite materials, methods of using the composite materials, sensors comprising the composite materials, and the like.

19 Claims, 26 Drawing Sheets

(52) U.S. Cl.
CPC ........ *G01N 27/128* (2013.01); *C08J 2353/00* (2013.01); *C08K 2201/001* (2013.01); *C08K 2201/011* (2013.01)

(58) Field of Classification Search
CPC .... C08K 3/041; G01N 27/121; G01N 27/127; G01N 27/128
See application file for complete search history.

(56) References Cited

U.S. PATENT DOCUMENTS

| | | | |
|---|---|---|---|
| 2016/0104554 A1* | 4/2016 | Zhong | B29C 39/14 252/511 |
| 2016/0297952 A1 | 10/2016 | Chen et al. | |
| 2017/0322167 A1 | 11/2017 | Swager et al. | |

OTHER PUBLICATIONS

Bai, et al., "Titanium Dioxide Nanomaterials for Sensor Applications", Chemical Reviews, vol. 114, Jun. 12, 2014, pp. 10131-10176.

Banks, et al., "Electrocatalysis at Graphite and Carbon Nanotube Modified Electrodes: Edge-Plane Sites and Tube Ends Are the Reactive Sites", Chemical Communications, vol. 36, 2005, pp. 829-841.

Baughman, et al., "Carbon Nanotubes—The Route Toward Applications", Science, vol. 297, Aug. 2, 2002, pp. 787-792.

Borini, et al., "Ultrafast Graphene Oxide Humidity Sensors", ACS Nano, vol. 7, 2013, pp. 11166-11173.

Buvailo, et al., "TiO2/LiCl-Based Nanostructured Thin Film for Humidity Sensor Applications", ACS Applied Materials & Interfaces, vol. 3, Feb. 1, 2011, pp. 528-533.

Chattopadhyay, et al., "A Route for Bulk Separation of Semiconducting from Metallic Single-Wall Carbon Nanotubes", Journal of the American Chemical Society, vol. 125, 2003, pp. 3370-3375.

Cheng, et al., "Highly Sensitive Humidity Sensor based on Aamorphous Al2O3 Nanotubes", Journal of Materials Chemistry, vol. 21, 2011, pp. 1907-1912.

Cui, et al., "Nanowire Nanosensors for Highly Sensitive and Selective Detection of Biological and Chemical Species", Science, vol. 293, Aug. 17, 2001, pp. 1289-1292.

Demir, et al., "Electrical Characterization of CdS Nanoparticles for Humidity Sensing Applications", Industrial & Engineering Chemistry Research, vol. 51, Jan. 25, 2012, pp. 3309-3313.

Hersam, "Progress Towards Monodisperse Single-Walled Carbon Nanotubes", Nature Nanotechnology, vol. 3, Jul. 2008, pp. 387-394.

Herzer, et al., "Printable Optical Sensors Based on H-Bonded Supramolecular Cholesteric Liquid Crystal Networks", Journal of the American Chemical Society, vol. 134, Apr. 23, 2012, pp. 7608-7611.

Hu, et al., "Continuous Size Tuning of Monodisperse ZnO Colloidal Nanocrystal Clusters by a Microwave-Polyol Process and Their Application for Humidity Sensing", Advanced Materials, vol. 20, 2008, pp. 4845-4850.

Hu, et al., "Visually Readable and Highly Stable Self-Display Photonic Humidity Sensor", Journal of Materials Chemistry, vol. 22, Dec. 2011, pp. 1021-1027.

Huang, et al., "Nanoelectronic Biosensing of Dynamic Cellular Activities Based on Nanostructured Materials", Advanced Materials, vol. 22, 2010, pp. 2818-2823.

Jia, et al., "Nanoengineered Transparent, Free-Standing, Conductive Nanofibrous Membranes", Journal of Physical Chemistry C, vol. 113, 2009, pp. 19525-19530.

Jung, et al., "Reverse-micelle-induced Porous Pressure-Sensitive Rubber for Wearable Human-Machine Interfaces", Advanced Materials, vol. 26, 2014, pp. 4825-4830.

Kim, et al., "Colorimetric and Resistive Polymer Electrolyte Thin Films for Realtime Humidity Sensors", ACS Applied Materials & Interfaces, vol. 4, Sep. 6, 2012, pp. 5179-5187.

Kolmakov, et al., "Detection of CO and O2 using Tin Oxide Nanowire Sensors", Advanced Materials, vol. 15, 2003, pp. 997-1000.

Kuang, et al., "High-Sensitivity Humidity Sensor Based on a Single SnO2 Nanowire", Journal of the American Chemical Society, vol. 129, 2007, pp. 6070-6071.

Lee, et al., "Polymeric Humidity Sensor Using Polyelectrolytes Derived from Alkoxysilane Cross-Linker", Sensors and Actuators B: Chemical, vol. 105, 2005, pp. 150-158.

Li, et al., "Constructing Fast Carrier Tracks into Flexible Perovskite Photodetectors To Greatly Improve Responsivity", ACS Nano, vol. 11, Jan. 20, 2017, 9 pages.

Li, et al., "Highly Sensitive and Stable Humidity Nanosensors Based on LiCl Doped TiO2 Electrospun Nanofibers", Journal of the American Chemical Society, vol. 130, 2008, pp. 5036-5037.

Li, et al., "Porous Ionic Membrane Based Flexible Humidity Sensor and its Multifunctional Applications", Advanced Science, vol. 4, 1600404, 2017, pp. 1-7.

Lin, et al., "Investigations on the Sensing Mechanism of Humidity Sensors Based on Electrospun Polymer Nanofibers", Sensors and Actuators B: Chemical, vols. 171-172, 2012, pp. 309-314.

Luo, et al., "A Micelle Fusion-Aggregation Assembly Approach to Mesoporous Carbon Materials with Rich Active Sites for Ultrasensitive Ammonia Sensing", Journal of the American Chemical Society, vol. 138, 2016, pp. 12586-12595.

Mintova, et al., "Humidity Sensing with Ultrathin LTA-Type Molecular Sieve Films Grown on Piezoelectric Devices", Chemistry of Materials, vol. 13, 2001, pp. 901-905.

Mutuma, et al., "Hollow Carbon Spheres and a Hollow Carbon Sphere/Polyvinylpyrrolidone Composite as Ammonia Sensors", Journal of Materials Chemistry A, vol. 5, 2017, pp. 2539-2549.

O'Connell, et al., "Band Gap Fluorescence from Individual Single-Walled Carbon Nanotubes", Science, vol. 297, Jul. 26, 2002, pp. 593-596.

Paek, et al., "Efficient Colorimetric pH Sensor Based On Responsive Polymer-Quantum Dot Integrated Graphene Oxide", ACS Nano, vol. 8, No. 3, Feb. 18, 2014, pp. 2848-2856.

Peinemann, et al., "Asymmetric Superstructure Formed in a Block Copolymer via Phase Separation", Nature Materials, vol. 6, Dec. 2007, pp. 992-996.

Phillip, et al., "Tuning Structure and Properties of Graded Triblock Terpolymer-Based Mesoporous and Hybrid Films", Nano Letters, vol. 11, Jun. 7, 2011, pp. 2892-2900.

Rubinger, et al., "Sulfonated Polystyrene Polymer Humidity Sensor: Synthesis and Characterization", Sensors and Actuators B, vol. 123, 2007, pp. 42-49.

Shi, et al., "Humidity Sensing Based on Nanoporous Polymeric Photonic Crystals", Sensors and Actuators B, vol. 129, 2008, pp. 391-396.

Stuart, et al., "Emerging Applications of Stimuli-Responsive Polymer Materials", Nature Materials, vol. 9, Feb. 2010, pp. 101-113.

Sun, et al., "Study on Humidity Sensing Property Based on TiO2 Porous Film and Polystyrene Sulfonic Sodium", Sensors and Actuators B, vol. 139, 2009, pp. 543-547.

Tellis, et al., "Relative Humidity Sensors Based on an Environment-Sensitive Fluorophore in Hydrogel Films", Analytical Chemistry, vol. 83, Dec. 22, 2010, pp. 928-932.

Tomer, et al., "Cubic Mesoporous Ag@CN: A High Performance Humidity Sensor", Nanoscale, vol. 8, 2016, 22 pages.

(56) References Cited

OTHER PUBLICATIONS

Ueda, et al., "Water-Resistant Humidity Sensors Based on Sulfonated Polyimides", Sensors and Actuators B, vol. 127, 2007, pp. 463-470.
Virji, et al., "Polyaniline Nanofiber Gas Sensors: Examination of Response Mechanisms", Nano Letters, vol. 4, 2004, pp. 491-496.
Wang, et al., "Polymer Nanofibers Embedded with Aligned Gold Nanorods: A New Platform for Plasmonic Studies and Optical Sensing", Nano Letters, vol. 12, May 14, 2012, pp. 3145-3150.
Wang, et al., "The Sol-Gel Template Synthesis of Porous Tio2 for a High Performance Humidity Sensor", Nanotechnology, vol. 22, 275502, May 20, 2011, pp. 1-9.
Wei, et al., "Multifunctional Chemical Vapor Sensors of Aligned Carbon Nanotube and Polymer Composites", Journal of the American Chemical Society, vol. 128, No. 5, 2006, pp. 1412-1413.
Yokota, et al., "Ultraflexible, Large-Area, Physiological Temperature Sensors for Multipoint Measurements", PNAS, vol. 112, No. 47, Nov. 24, 2015, pp. 14533-14538.
Yoon, et al., "Surface-Anchored Poly(4-vinylpyridine)-Single-Walled Carbon Nanotube-Metal Composites for Gas Detection", Chemistry of Materials, vol. 28, 2016, pp. 5916-5924.
Yu, et al., "Self-Assembled Asymmetric Block Copolymer Membranes: Bridging the Gap from Ultra- to Nanofiltration", Angewandte Chemie International Edition, vol. 54, 2015, 7 pages.
Yu, et al., "Self-Assembled Isoporous Block Copolymer Membranes With Tuned Pore Sizes", Angewandte Chemie International Edition, vol. 53, 2014, pp. 10072-10076.
Zainelabdin, et al., "CuO/ZnO Nanocorals Synthesis via Hydrothermal Technique: Growth Mechanism and their Application as Humidity Sensor", Journal of Materials Chemistry, vol. 22, No. 23, 2012, pp. 11583-11590.
Zhang, et al., "Na+-Doped Zinc Oxide Nanofiber Membrane for High Speed Humidity Sensor", Journal of the American Ceramic Society, vol. 93, 2009, pp. 142-146.
Zhang, et al., "Roles of Inter-SWCNT Junctions in Resistive Humidity Response", Nanotechnology, vol. 26, 2015, 26 pages.
Zilberman, et al., "Nanoarray of Polycyclic Aromatic Hydrocarbons and Carbon Nanotubes for Accurate and Predictive Detection in Real-World Environmental Humidity", ACS Nano, vol. 5, No. 8, Jul. 20, 2011, pp. 6743-6753.
Search Report and Written Opinion for PCT/IB2018/059365 dated Mar. 13, 2019.
Hilke, et al., "Block Copolymer Hollow Fiber Membranes with Catalytic Activity and pH-Response", ACS Appl. Mater. Interfaces, 5, 2013, 7001-7006.
Kuila, et al., "Transparent, Versatile chemical Vapor Sensor Using Supramolecular Assembly of Block Copolymer and Carbon Nanotubes a", Macromol. Rapid Commun. 31, 2010, 1881-1885.
Wang, et al., "Sensors for organic vapor detection based on composites of carbon nonotubes functionalized with polymers", Elsevier ScienceDirect, Sensors and Actuators B, 124,, 2007, 360-367.

\* cited by examiner

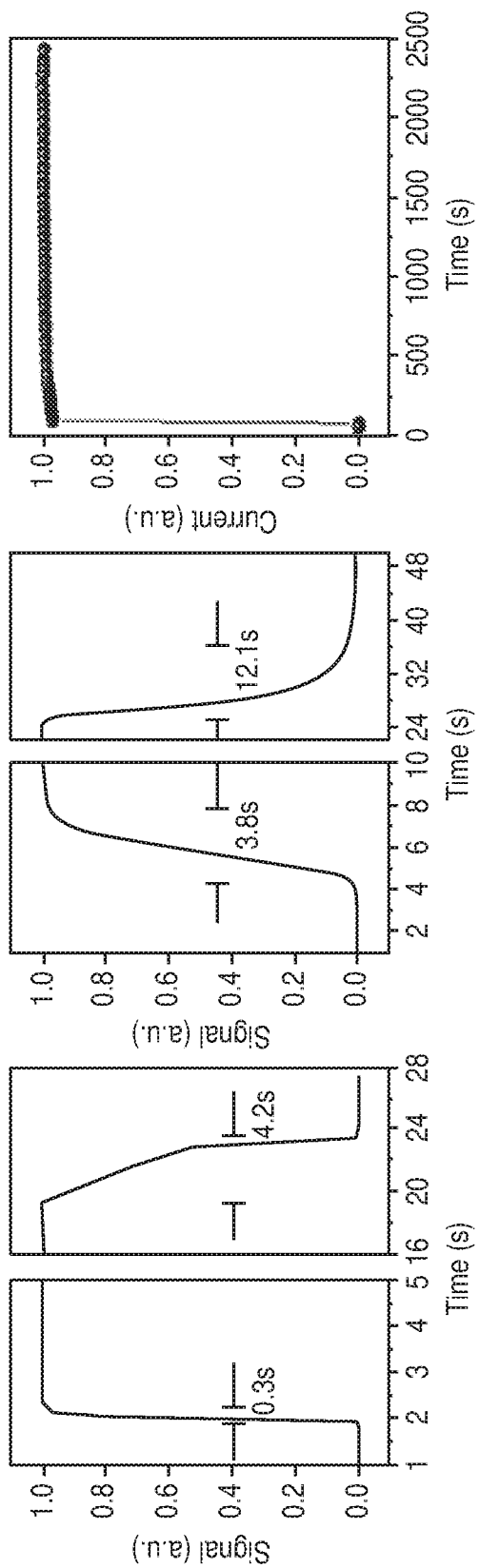

COMPOSITE MATERIALS FOR SENSING APPLICATIONS

BACKGROUND

Chemiresistive sensors have broad potential due to their diverse practical applications in different fields ranging from environmental monitoring, industrial processes, and human comfort. Desirable attributes of an ideal chemiresistive sensor comprise higher sensitivity, wider range, shorter response, and fast recovery times. To meet these demands, various nanostructured sensing devices especially one-dimensional (1D) carbon, metal nanowires, and porous ceramics have been explored, owing to their high surface to volume ratio. However, tedious processes like high-temperature preparation and complex device fabrication restrict their comprehensive implementation. There is a need to advance modular design and fabrication methods.

Ease of fabrication, tunable chemical and structural properties, and flexibility of polymers make them particularly attractive for future applications in wearable/attachable devices. In particular, polymer-based devices with nanostructured morphologies have received considerable interest due to their high surface area. In the case of vapor sensing, porous structures can expedite the fast penetration and diffusion of vapors, shortening the response and recovery time significantly. However, fabrication of long-range ordered films with well-defined nanoporous patterned arrays for sensors remains an alluring goal.

SUMMARY

In general, embodiments of the present disclosure describe composite materials, methods of fabricating composite materials, sensors based on the composite materials, methods of detecting chemical species, and the like.

Accordingly, embodiments of the present disclosure describe a composite material comprising an isoporous block copolymer film and a plurality of carbon nanoparticles embedded in the isoporous block copolymer film.

Embodiments of the present disclosure describe a method of fabricating a composite material comprising forming a casting solution including a functional material, block copolymer, and solvent, wherein at least the functional material is homogenously dispersed in the solvent; casting the casting solution on a substrate; evaporating the solvent for a select period of time; and immersing in a non-solvent.

Embodiments of the present disclosure describe a method of detecting one or more chemical species comprising exposing a sensor to an environment, wherein the sensor includes a composite material with carbon nanotubes embedded in an isoporous block copolymer film; and detecting a presence of one or more chemical species.

Embodiments of the present disclosure describe a method of detecting one or more chemical species comprising sorbing one or more chemical species onto a sensor, wherein the sensor includes a composite material with CNTs embedded in an isoporous block copolymer film; and measuring a change in an electronic property of the sensor.

Embodiments of the present disclosure describe a sensor comprising a first electrode, a second electrode, and a composite material, wherein the composite material includes an isoporous block copolymer film and a plurality of carbon nanotubes embedded in the film.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 20A-20C are graphical views showing the transient response at 95% RH for (A) CNT-PS-b-P4VP and (B) pristine PS-b-P4VP sensor; and (C) Stability of the CNT-PS-b-P4VP sensor under prolonged humidity (95%) exposure, according to one or more embodiments of the present disclosure.

DETAILED DESCRIPTION

Figure 1:
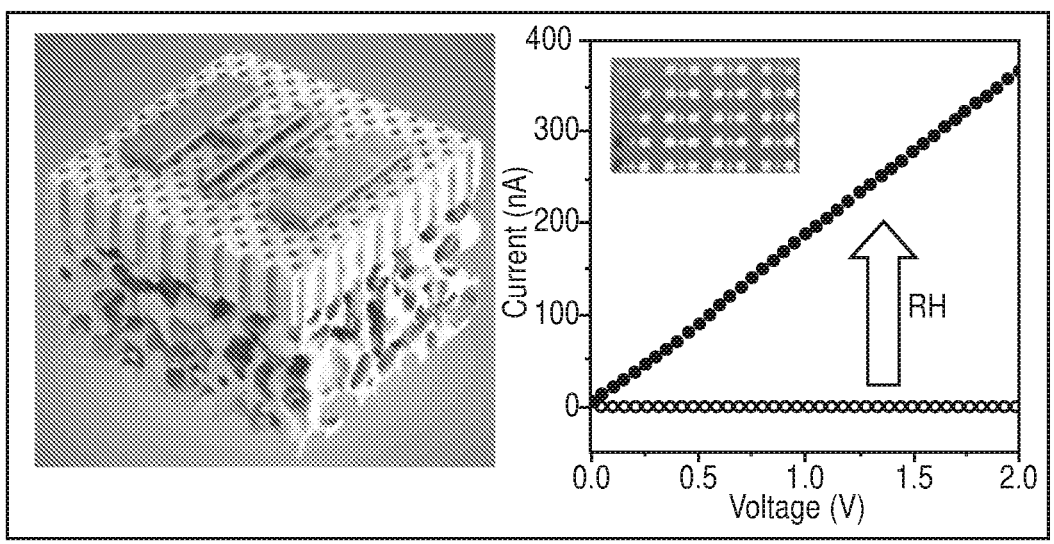
FIG. 1 is a schematic diagram of a sensor, according to one or more embodiments of the present disclosure.

The invention of the present disclosure relates to composite materials including functional materials embedded in a polymer matrix for various sensing applications. In particular, the invention of the present disclosure relates to composite materials including carbon nanoparticles embedded in an isoporous film for vapor sensing applications. For example, the composite materials described herein may be used as gas/vapor sensors for detecting, among other things, humidity and volatile organic compounds (VOCs). The composite materials described herein exhibit unprecedented sensitivity and detection speeds, including fast response and recovery times, as compared to conventional materials, which suffer from low sensitivity and slow detection speeds, due to their inherently insulating or non-conductive nature.

The enhanced performance of the composite materials described herein may be a result of, among other things, the synergistic combination of an isoporous film and carbon nanoparticles embedded therein. For example, the composite materials described herein may be highly porous, with nanochannel arrays aligned perpendicular or substantially perpendicular to a surface of the isoporous film. The high porosity of the composite material may allow for rapid absorption/adsorption and/or desorption of vapors. The presence of conductive carbon nanoparticles in the composite material enhances the overall conductivity of the composite materials. In particular, the efficient charge extraction ability of the carbon nanoparticles enhance charge transfer, and improve both sensitivity and detection speed of the composite materials.

The present disclosure further describes novel methods of fabricating the composite materials described herein. The methods of the present disclosure may combine block copolymer self-assembly and non-solvent induced phase separation to form self-standing defect-free films with a highly isoporous morphology suitable for a variety of sensing applications. The methods of the present disclosure may be tuned or optimized by selecting, varying, adjusting, and/or modifying one or more of the functional material content, polymer concentration, solvent ratio, and evaporation time, among other things.

While conventional materials suffer from aggregation and/or agglomeration of functional materials, the methods of the present disclosure may form composite materials containing a uniform distribution of functional materials (e.g., carbon nanoparticles, etc.) in an isoporous film. For example, the composite materials may include a uniform distribution and/or a random network of functional materials embedded in an isoporous film. In solution, the block copolymer or a polymer block of the block copolymer may interact with the functional material sufficient to form a stable homogenous dispersion. For example, the block copolymer may interact with the sidewalls or end caps of carbon nanotubes sufficient to provide a homogeneous CNT dispersion. The uniform distribution of functional materials may include a random network of the functional materials (e.g., carbon nanoparticles) embedded in the isoporous film. In this way, the methods of the present disclosure overcome challenges aggregation or agglomeration of the functional materials (e.g., carbon nanotubes), while also preserving, or not altering, the desirable properties of carbon nanoparticles (e.g., 1D characteristic of carbon nanotubes).

The composite materials of the present disclosure may be used as sensors for detecting one or more chemical species, which may include, but is not limited to, one or more of water (e.g., in the form of humidity/moisture) and volatile organic compounds (VOCs). See, for example, FIG. 1. The composite materials described herein may be used to detect chemical species by sorbing and/or desorbing one or more chemical species and measuring a change in an electronic property of the sensor. The electronic properties of the sensor may include one or more of impedance, resistance, and capacitance. In many embodiments, the composite materials may be used as chemiresistive sensors, wherein a change in electrical resistance of the composite materials or sensor is observed or measured in response to its surrounding environment. These examples shall not be limiting as the composite materials may be suitable for use in other types of sensors.

Definitions

The terms recited below have been defined as described below. All other terms and phrases in this disclosure shall be construed according to their ordinary meaning as understood by one of skill in the art.

As used herein, "carbon nanoparticle" refers to any nanoparticle including carbon as a primary or majority component. An example of a carbon nanoparticle includes, but is not limited to, one or more of diamond, graphite, fullerenes, carbon nanotubes, and carbon fibers.

As used herein, "carbon nanotube" or "CNT" refers to single-walled carbon nanotubes (SWCNT) and multi-walled carbon nanotubes (MWCNT) (e.g., double-walled carbon nanotubes (DWCNT), and structural variations and modifications thereof, including, but not limited to, configurations, structural defects and variations, tube arrangements, chemical modification and functionalization, and encapsulation.

As used herein, "casting" refers to disposing a material on, in, or around an object or mold, among other things. For example, casting may refer to disposing a solution of a material dissolved in a solvent on an object or mold (e.g., a substrate). Casting may include, but is not limited to, one or more of depositing, pouring, dipping, coating, and applying.

As used herein, "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

As used herein, "dispersing" refers to contacting two or more components sufficient to distribute components. Examples of dispersing include, but are not limited to, dispersing, sonicating, distributing, suspending, emulsifying, dissolving, etc. For example, a dispersion may include particles dispersed in a continuous phase of a different composition, state, or phase.

As used herein, "dissolving" refers providing one or more of a uniform, about uniform, and substantially uniform distribution. For example, dissolving may refer to dissolution of a first chemical species or solute (e.g., gas, liquid, solid) in a solvent forming a solution of the first chemical species in the original solvent.

As used herein, "exposing" refers to subjecting to conditions of an environment.

As used herein, "evaporating" refers to a loss of volume of a liquid by conversion into vapor.

As used herein, "immersing" refers to positioning an object beneath a liquid surface. The object may be partially or totally immersed. An example of immersing includes submerging.

As used herein, "nanoparticle" refers to one or more of nanospheres, nanorods, nanocups, nanowires, nanoclusters, nanolayers, nanotubes, nanocrystals, nanobeads, nanobelts, and nanodisks.

As used herein, "isoporous" refers to any film, membrane, material, etc. including pores with substantially the same diameter.

As used herein, "sorbing" refers to a process through which a substance attaches to another substance. Sorbing includes, but is not limited to, one or more of adsorption and absorption.

Figure 2:
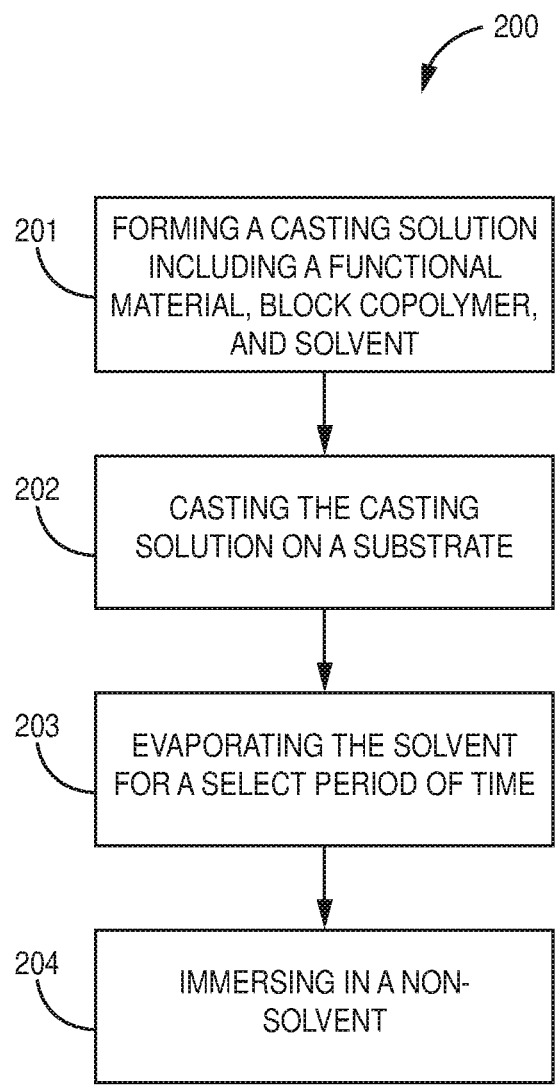
FIG. 2 is flowchart of a method of fabricating a sensor, according to one or more embodiments of the present disclosure.

FIG. 2 is a flowchart of a method of fabricating a composite material, according to one or more embodiments of the present disclosure. As shown in FIG. 2, the method 200 may comprise forming 201 a casting solution including a functional material, block copolymer, and solvent; casting 202 the casting solution on a substrate; evaporating 203 the solvent for a select period of time; and immersing 204 in a non-solvent.

At step 201, a casting solution including a functional material, block copolymer, and solvent is formed. Forming may generally include contacting one or more of the functional material, block copolymer, and solvent. Contacting may generally include bringing two or more components into physical contact, or immediate or close proximity. In many embodiments, the forming or the contacting is sufficient to form a dispersion. In these embodiments, the casting solution may include a dispersed solution or a dispersed casting solution. For example, the casting solution may include any solution in which at least the functional material is dispersed in the solvent. In a preferred embodiment, the casting solution may include a solution in which at least the functional material is homogenously dispersed in the solvent. In addition or in the alternative, the block copolymer may be dispersed or dissolved in the casting solution. Any techniques known in the art for dispersing (e.g., sonication or bath sonication) may be used herein.

The functional material may include any material that enhances an electronic property (e.g., conductivity) of the composite material. For example, the functional material may include one or more of carbon nanoparticles, carbon fibers, quantum dots, metal particles, and graphene. In many embodiments, the functional material includes carbon nanoparticles. The carbon nanoparticles may include any carbon nanoparticle that includes a one-dimensional (1D) structure and/or a high surface-to-volume ratio. For example, the functional material may include one or more of carbon nanotubes, carbon nanospheres, carbon nanorods, carbon nanowires, and carbon nanoclusters, among others. In an embodiment, the functional material may include carbon nanotubes, wherein the carbon nanotubes include one or more of single-walled carbon nanotubes and multi-walled carbon nanotubes. In a preferred embodiment, the functional material includes carbon nanotubes. In another preferred embodiment, the functional material includes 1D carbon nanotubes. In another preferred embodiment, the functional material includes 1D single-walled carbon nanotubes.

A content of the functional material in the casting solution may be less than about 3 wt. %. In an embodiment, a content of the functional material in the casting solution may be about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, or about 3 wt. %. In a preferred embodiment, a content of the functional material in the casting solution may be about 1 wt. %. In other embodiments, a content of the functional material in the casting solution may be greater than about 3 wt. %.

The block copolymer may include any block copolymer suitable for forming an isoporous structure. The block copolymer may include one or more polymer blocks. For example, the block copolymer may include one or more of a hydrophobic polymer block and a hydrophilic polymer block. In an embodiment, the block copolymer includes one or more hydrophobic polymer blocks and one or more hydrophilic polymer blocks. In an embodiment, the block copolymer includes one or more hydrophobic polymer blocks (e.g., two hydrophobic blocks). In an embodiment, the block copolymer includes one or more hydrophilic polymer blocks (e.g., two hydrophilic polymer blocks).

The block copolymer may include one or more of polystyrene, poly-4-vinylpyridine, poly-2-vinylpyridine, polybutadiene, polyisoprene, poly(ethylene-stat-butylene), poly(ethylene-alt-propylene), polysiloxane, polyalkyleneoxide, poly-ε-caprolactone, polylactide, polyalkylmethacrylate, polymethacrylic acid, polyalkylacrylate, polyacrylic acid, polyhydroxyethylmethacrylate, polyacrylamide, poly-N-alkylacrylamide, polysulfone, polyaniline, polypyrrole, polytriazole, polyvinylimidazole, polytetrazole, polyethylenediamine, polyvinylalcohol, polyvinylpyrrolidone, polyoxadiazole, polyvinylsulfonic acid, polyvinylphosphonic acid, and polymers with quarternary ammonium groups. In many embodiments, the block copolymer includes one or more of polystyrene and poly-4-vinylpyridine. In a preferred embodiment, the block copolymer includes PS-b-P4VP.

A molecular weight of the block copolymer may range from about 50 kDa to about 200 kDa. In many embodiments, a molecular weight of the block copolymer may be about 50 kDa, about 100 kDa, about 150 kDa, or about 200 kDa. In a preferred embodiment, a molecular weight of the block copolymer may be about 100 kDa. In other embodiments, a molecular weight of the block copolymer may be less than about 50 kDa or greater than about 200 kDa.

A content of the block copolymer in the casting solution may range from about 10 wt. % to about 30 wt. %. In an embodiment, a content of the block copolymer in the casting solution may be about 10 wt. %, about 15 wt. %, about 20 wt. %, about 25 wt. %, or about 30 wt. %. In many embodiments, a content of the block copolymer in the casting solution may range from about 12 wt. % to about 30 wt. %. In a preferred embodiment, a content of the block copolymer in the casting solution may be about 20 wt. %.

The solvent may include any solvent suitable for forming the casting solution. In some embodiments, the solvent may include any solvent suitable for dissolving or partially dissolving the block copolymer and/or dispersing the functional material and/or forming an isoporous structure. Solvents suitable for dissolving the block copolymer may dissolve each of the polymer blocks of the block copolymer. Solvents suitable for partially dissolving the block copolymer may dissolve at least one of the polymer blocks of the block copolymer. In preferred embodiments, at least one solvent has a high volatility and/or the solvent or solvent mixture is miscible with water.

The solvent may include a single solvent or mixture of solvents (e.g., binary solvent mixtures, ternary solvent mixtures, etc.). For example, in some embodiments, the solvent may include two or more solvents, three or more solvents, and so on. The solvent may include one or more of dimethylformamide, dimethylacetamide, N-methylpyrrolidone, dimethylsulfoxide, tetrahydrofurane, dioxane, and other such solvents. In an embodiment, the solvent includes one or more of dimethylformamide, tetrahydrofuran, and dioxane.

A solvent ratio may depend on the block copolymer and/or functional material. In embodiments in which two or more solvents are used, a solvent ratio may be about 1:1 in a case of a binary solvent mixture or about 1:1:1 in a case of a ternary solvent mixture.

At step 202, the casting solution is cast on a substrate. Casting may generally include disposing or spreading a solution on, for example, a substrate. Any technique known in the art for casting may be used herein. For example, in an embodiment, casting includes casting a casting solution on a substrate (e.g., a glass plate) using a casting knife. Casting may be sufficient to form a composite material of a desired thickness. A thickness of the casting solution on the substrate may range from a few microns to greater than 1 mm. In an embodiment, a thickness of the casting solution is about 200 μm. In other embodiments, a thickness of the casting solution is less than a few microns or greater than 1 mm.

The substrate may include any substrate suitable for the methods of the present disclosure. In an embodiment, the substrate may include glass (e.g., a glass plate), metal, or polymer foil (e.g. polypropylene). The substrate can be used as an intermediate support and removed such that it does not form a part of the final composite structure.

At step 203, solvent is evaporated for a select period of time. Evaporating may generally include a loss of volume of a liquid or liquid-like material by conversion into vapor. Evaporating may include one or more of partially evaporating, substantially evaporating, and completely evaporating. In a preferred embodiment, evaporating includes partially evaporating. In these embodiments, partially evaporating solvent may lead to an increase in concentration of the block copolymer and carbon nanoparticle at the air/solution interface. For example, in an embodiment, partially evaporating solvent may lead to an increase in a carbon nanotube-block copolymer concentration at the air/solution interface. The increase in concentration may trigger the formation of a well-ordered structure on a top surface of the film. In many embodiments, evaporating includes partially evaporating at about room temperature. In other embodiments, evaporating may include incubating for a select period of time sufficient to allow for evaporation or partial evaporation of the solvent.

The period of time of evaporation may range from about 0.1 seconds to about 60 seconds or more. For example, the period of time of evaporation may be about 0.1 s, about 1 s, about 2 s, about 3 s, about 4 s, about 5 s, about 6 s, about 7 s, about 8 s, about 9 s, about 10 s, or more than 10 s. In a preferred embodiment, evaporating is for about 10 s. In other embodiments, the period of time of evaporation may be less than about 0.1 s or greater than about 60 s.

Step 204 may include immersing in a non-solvent Immersing may generally include contacting with a non-solvent sufficient to form a composite material. Contacting may include bringing two or more components into physical contact, or immediate or close proximity. In many embodiments, immersing includes partial immersion in a non-solvent or complete immersion in a non-solvent.

The non-solvent may include any solution or liquid in which the block copolymer is not soluble or not sufficiently soluble such that a block copolymer phase separates upon being immersed in a non-solvent. The non-solvent may include one or more of water, methanol, ethanol, acetone, and any other non-solvents suitable for forming a composite material. In a preferred embodiment, the non-solvent is water.

In an embodiment, the method of fabricating a composite material comprises dispersing a functional material in a solvent to form a dispersion; adding a block copolymer to the dispersion to form a casting solution; casting the casting solution on a substrate; evaporating the solvent for a select period of time; and immersing in a non-solvent.

In an embodiment, the method comprises dispersing a carbon nanotube (CNT) in a ternary solvent mixture to form a homogenous CNT dispersion; adding PS-b-P4VP to the CNT dispersion to form a casting solution; casting the casting solution on a substrate; partially evaporating at least one solvent for about 10 s; and immersing in a non-solvent. In an embodiment, the CNT content is less than about 1 wt. %. In an embodiment, the ternary solvent mixture includes DMF, THF, and dioxane. In an embodiment, the non-solvent is water.

Embodiments of the present disclosure describe composite materials. Some embodiments of the present disclosure describe composite materials for sensing applications or vapor sensing applications. Other embodiments of the present disclosure describe sensors that include the composite materials. The composite materials may be fabricated according to the methods of the present disclosure.

The composite material may comprise an isoporous block copolymer film and a plurality of functional materials embedded in the isoporous block copolymer film. The isoporous block copolymer film may include any of the block copolymers of the present disclosure. The functional materials may include any of the functional materials of the present disclosure. In a preferred embodiment, the isoporous block copolymer film includes polystyrene-b-poly-4-vinylpyridine (PS-b-P4VP) and the functional materials include one or more of carbon nanotubes, 1D carbon nanotubes, and 1D single-walled carbon nanotubes.

The film may be provided on or near a surface of composite material. The film may be highly isoporous and/or highly porous. In many embodiments, the isoporous film may include a uniform pore morphology. For example, in an embodiment, the isoporous film may include a highly ordered dense array of nanochannels and/or nanopores aligned vertically, or perpendicular or substantially perpendicular to a surface of the film. In many embodiments, a diameter of the nanochannels and/or nanopores may be the same or substantially the same. The isoporous film may include a uniform distribution of the functional material. In many embodiments, the isoporous film may be characterized by a random network of functional material. In other embodiments, the isoporous film may be characterized by an ordered network of functional material. In some embodiments, the composite material may further include an interconnected porous sublayer or substructure. For example, in an embodiment, the composite material may further comprise a sponge-like open sublayer or substructure.

A thickness of the isoporous block copolymer film embedded with carbon nanoparticles may range from about 100 nm to about 800 nm. In a preferred embodiment, a thickness of the block copolymer film is about 400 nm. In other embodiments, a thickness of the block copolymer film may be about 100 nm, about 200 nm, about 300 nm, about 400 nm, about 500 nm, about 600 nm, about 700 nm, or about 800 nm. In an embodiment, a thickness of the block copolymer film may refer to a thickness of a sensing layer. In an embodiment, a thickness of the block copolymer film may refer to a channel length of pores of the block copolymer film.

A pore diameter of the block copolymer film embedded with carbon nanoparticles may range from about 1 nm to about 50 nm. In a preferred embodiment, the pore diameter is about 20 nm. In other embodiments, the pore diameter is about 1 nm, about 5 nm, about 10 nm, about 15 nm, about 20 nm, about 25 nm, about 30 nm, about 40 nm, or about 50 nm.

In an embodiment, a composite material may comprise an isoporous block copolymer film, and a plurality of functional materials embedded in the isoporous block copolymer film.

In an embodiment, a composite material may comprise an isoporous block copolymer film, wherein the isoporous block copolymer film includes PS-b-P4VP, and a plurality of carbon nanotubes embedded in the isoporous block copolymer film.

In an embodiment, a composite material may comprise a skin layer and a support layer, wherein the skin layer includes an isoporous block copolymer film and a plurality of functional materials embedded in the isoporous block copolymer film.

In an embodiment, a composite material may comprise a skin layer and a support layer, wherein the skin layer includes an isoporous block copolymer film, wherein the isoporous block copolymer film includes PS-b-P4VP, and a plurality of carbon nanotubes embedded in the isoporous block copolymer film.

Embodiments of the present disclosure further describe sensors based on or incorporating the composite materials described herein. In particular, embodiments of the present disclosure describe sensors comprising a composite material, wherein the composite material includes an isoporous block copolymer film and a plurality of functional materials embedded in the isoporous block copolymer film. Any of the composite materials and components thereof of the present disclosure may be used herein.

Figure 3:
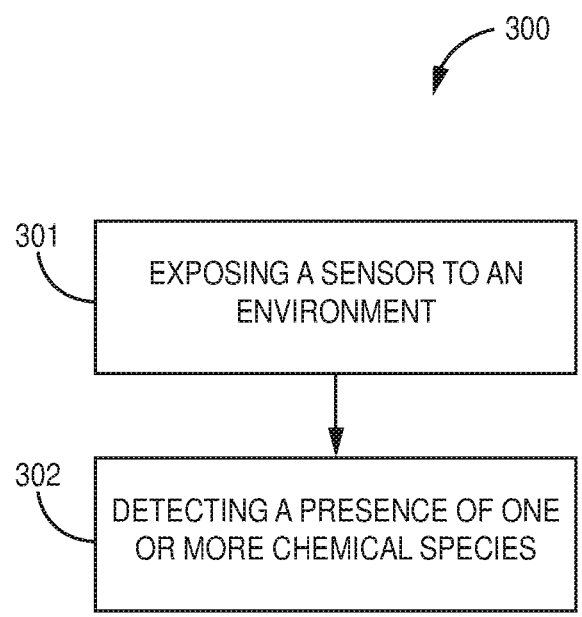
FIG. 3 is a flowchart of a method of detecting a chemical species, according to one or more embodiments of the present disclosure.

FIG. 3 is a flowchart of a method of detecting one or more chemical species, according to one or more embodiments of the present disclosure. As shown in FIG. 3, the method 300 may comprise exposing 301 a sensor to an environment, wherein the sensor includes a composite material with functional materials embedded in an isoporous block copolymer film, and detecting 302 a presence of one or more chemical species.

At step 301, the sensor is exposed to the environment. Exposing may include subjecting the sensor to conditions of an environment. The environment may or may not include one or more of the chemical species to be detected. In some embodiments, the environment may be characterized by a relative humidity (RH). The relative humidity may range from about 10% RH to about 95% RH. In an embodiment, the relative humidity is about 10% RH, about 33% RH, about 55% RH, about 75% RH, about 85% RH, or about 95% RH. In other embodiments, the relative humidity may be less than about 10% or greater than about 95%.

The sensor may include a composite material. The composite material may include any of the composite materials or sensors of the present disclosure. In many embodiments, the composite material may include an isoporous block copolymer film and a plurality of functional materials embedded in the isoporous block copolymer film. In these embodiments, any of the block copolymers, functional materials, and/or isoporous block copolymer films of the present disclosure may be used herein. In a preferred embodiment, the composite material or sensor includes functional materials and an isoporous block copolymer film, wherein the functional materials are carbon nanotubes (e.g., single-walled carbon nanotubes), wherein the isoporous block copolymer film is an isoporous PS-b-P4VP film, wherein the carbon nanotubes are embedded in the isoporous block copolymer film. In an embodiment, the plurality of carbon nanotubes include a plurality of single-walled carbon nanotubes.

At step 302, a presence of one or more chemical species in the environment is detected. Detecting may include measuring and/or monitoring a change in an electronic property of the sensor in response to an interaction between the sensor and one or more chemical species. The detecting may be used to determine a presence and/or concentration of one or more chemical species. In some embodiments, the interaction may be characterized as a change in an electronic property of the sensor upon sorbing and/or desorbing one or more chemical species. For example, a change in electrical resistance may be measured in response to the sorption and/or desorption of one or more chemical species. In an embodiment, a resistivity of the sensor may decrease with increasing humidity levels. In an embodiment, a response time of the sensor may be less than about 10 s. In preferred embodiments, a response time of the sensor may be less than about 3 s, about 2 s, or about 1s. The electronic properties that may be monitored and/or measured include, but are not limited to, one or more of resistance, conductance, and impedance.

The chemical species that may be detected include one or more of water vapor (e.g., in the form of moisture, humidity, water vapor, etc.) and volatile organic compounds. The volatile organic compounds, include, but are not limited to, one or more of methanol, ethanol, propanol (e.g., 1-propanol, 2-propanol, etc.) methane, propane, isobutene, n-butane, etc.

In an embodiment, the method 300 may comprise exposing 301 a sensor to an environment, wherein the sensor includes a composite material including an isoporous block copolymer film and a plurality of functional materials embedded in the isoporous block copolymer film, and detecting 302 a presence of one or more chemical species.

In an embodiment, the method 300 may comprise exposing 301 a sensor to an environment, wherein the sensor includes a composite material including an isoporous block copolymer film, wherein the isoporous block copolymer film includes PS-b-P4VP, and a plurality of carbon nanotubes embedded in the isoporous block copolymer film, and detecting 302 a presence of one or more chemical species.

Figure 4:
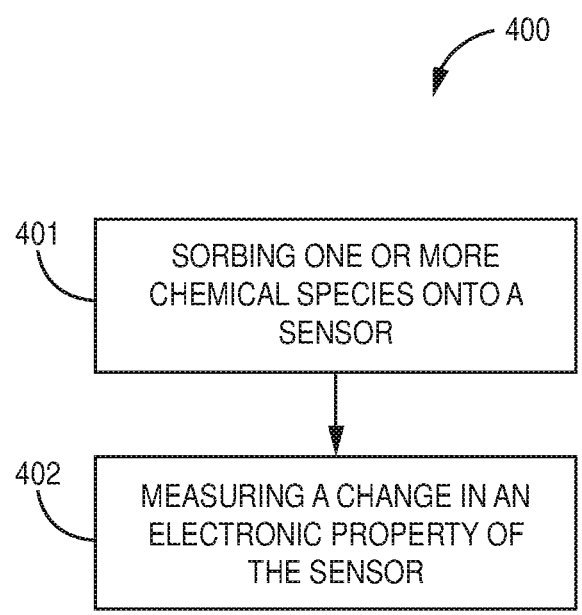
FIG. 4 is a flowchart of a method of detecting a chemical species, according to one or more embodiments of the present disclosure.

FIG. 4 is a flowchart of a method of detecting a chemical species, according to one or more embodiments of the present disclosure. As shown in FIG. 4, the method 400 may comprise sorbing 401 one or more chemical species onto a sensor, wherein the sensor includes a composite material with carbon nanoparticles embedded in an isoporous block copolymer film; and measuring 402 a change in an electronic property of the sensor.

At step 401, one or more chemical species may be sorbed onto the sensor. Sorbing generally includes one or more of absorbing, adsorbing, and desorbing. One or more chemical species may interact with the block copolymer film. For example, the block copolymer film may sorb one or more chemical species. In an embodiment, the block copolymer film may absorb and/or desorb one or more chemical species. In an embodiment, the block copolymer film may absorb one or more chemical species. In an embodiment, the block copolymer may desorb one or more chemical species. The one or more chemical species may include one or more of water (e.g., in a form of humidity, moisture, water vapor, etc.) and volatile organic compounds. Any of the volatile organic compounds described herein may be used herein.

At step 402, a change in an electronic property is measured. Measuring may include one or more of detecting, monitoring, determining, etc. The sorbing and/or desorbing of one or more chemical species may correspond to a change in an electronic property of the block copolymer film. In this way, a change in an electronic property of the block copolymer film may be monitored and/or measured to determine a presence and/or concentration of one or more chemical species. For example, in many embodiments, the sensor is a chemiresistive sensor, wherein an electrical resistance of the block copolymer film changes in response to its surrounding environment (e.g., upon sorbing and/or desorbing one or more chemical species). In an embodiment, a resistivity of the sensor decreases with increasing humidity levels. In preferred embodiments, a response time of the sensor may be less than about 3 s, about 2 s, or about 1 s. In other embodiments, the electronic property may include one or more of resistance, capacitance, and impedance.

Embodiments of the present disclosure describe a sensor comprising a first electrode, a second electrode, and a composite material, wherein the composite material comprises an isoporous block copolymer film and a plurality of carbon nanotubes embedded in the film. In an embodiment, one or more of the first electrode and the second electrode may be deposited on a surface of the composite material. In an embodiment, one or more of the first electrode and the second electrode may be interdigitated. In an embodiment, one or more of the first electrode and the second electrode may include one or more of gold, chromium, titanium, and aluminum. In an embodiment, the sensor may further comprise a substrate. In an embodiment, the sensor may detect one or more chemical species and/or an amount of one or more chemical species. In an embodiment, the sensor is a chemiresistive sensor. In other embodiments, the sensor may include any conventional components of a sensor known in the art.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

Isoporous block copolymer (BCP) films are of interest as highly selective membranes, stemming from their unique morphological features, but their applications in functional devices remain to be realized. In this Example, efficient incorporation of single-walled carbon nanotube (SWCNT) into isoporous block copolymer films for chemiresistive sensing was demonstrated for the first time. Leveraging the efficient charge extraction ability of CNTs together with nanochannel arrays aligned perpendicular to the surface of the films, an ultrafast response time of about 0.3 s was achieved for humidity detection with a sensitivity of ~800 on changing humidity from about 10% to about 95%. Furthermore, the sensor responded efficiently to various organic vapors, underscoring its promising detection capability.

Chemicals and Reagents

Polystyrene-b-poly-4-vinylpyridine block copolymer P9957-S4VP (PS-b-P4VP 139,000-b-40,000 g/mol; PDI=1.1) was purchased from Polymer Source, Inc., Canada. N,N-dimethylformamide (DMF), 1,4-dioxane, n-methyl-2-pyrrolidone (NMP) and ethanol (96%) were acquired from Sigma-Aldrich. Tetrahydrofuran (THF) was received from Fischer Scientific. Commercial Polystyreneco-poly-2-vinylpyridine (PS-co-P2VP, 130,000 g/mol) was purchased from Sigma-Aldrich. Single-walled carbon nanotubes (SWCNT) with 300-2300 nm length were purchased from Aldrich (cat. No. 704121). All chemicals were used as received. Deionized (DI) water purified with a Milli-Q system (Millipore, Inc.) was used in this study.

Preparation of SWCNT-PS-b-P4VP Films

Figure 5:
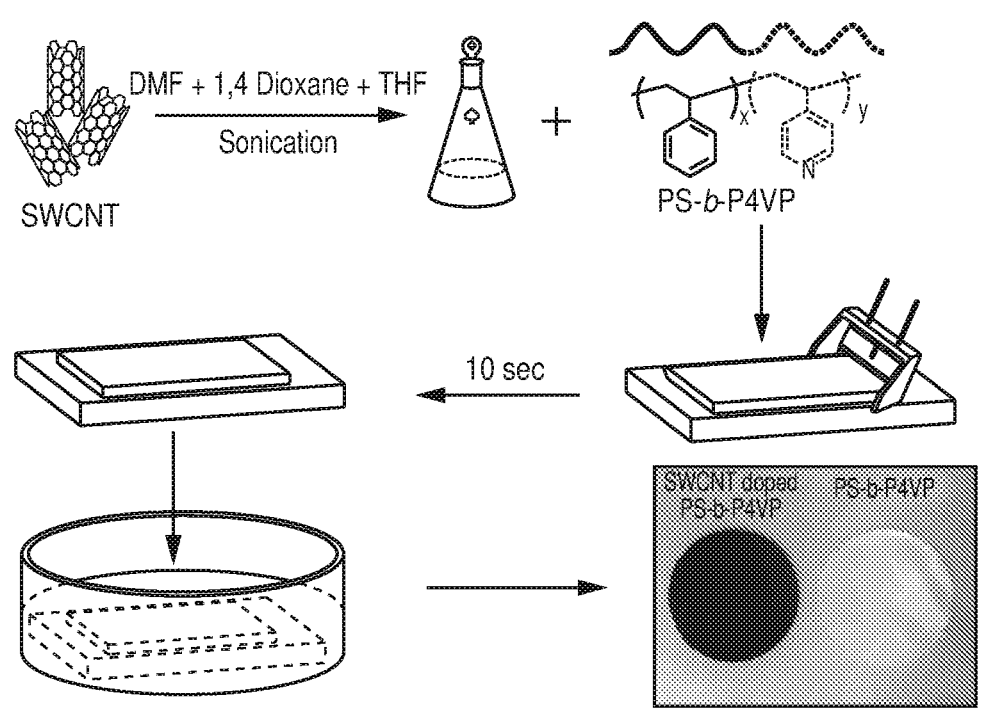
FIG. 5 is a schematic representation of a method of fabricating a CNT-PS-b-P4VP film, according to one or more embodiments of the present disclosure.
Figure 6A:
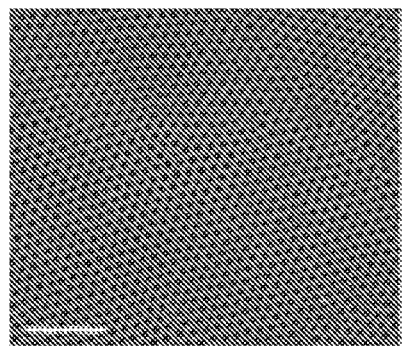
FIGS. 6A-6D are SEM images of CNT-PS-b-P4VP films with various concentrations of CNTs, where all scales in the figures are 500 nm, according to one or more embodiments of the present disclosure.
Figure 6B:
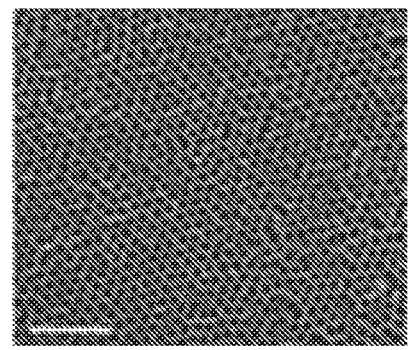
Figure 6C:
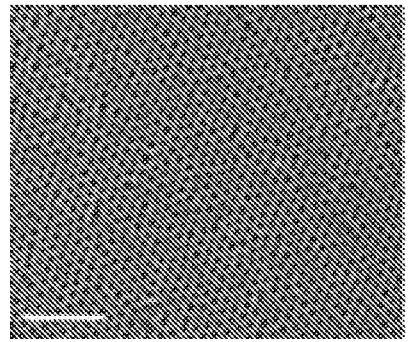
Figure 6D:
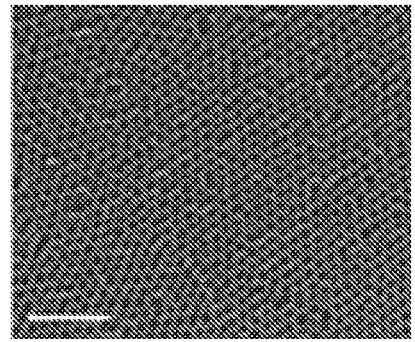
Figure 7A:
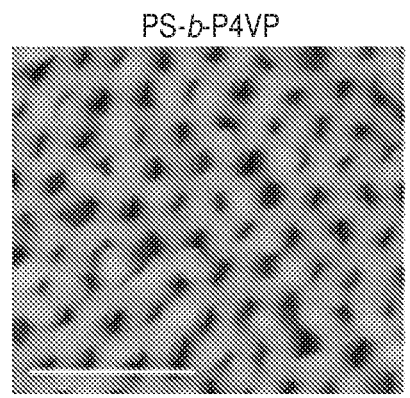
FIGS. 7A-7D are AFM images of CNT-PS-b-P4VP films with various concentrations of CNTs, where all scales in the figures are 500 nm, according to one or more embodiments of the present disclosure.
Figure 7B:
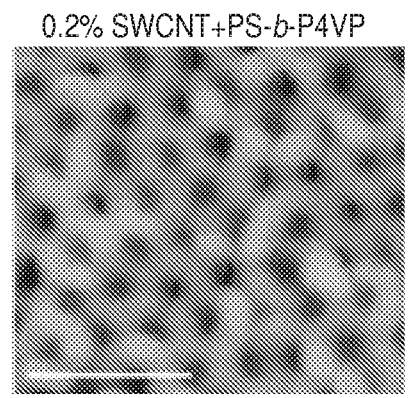
Figure 7C:
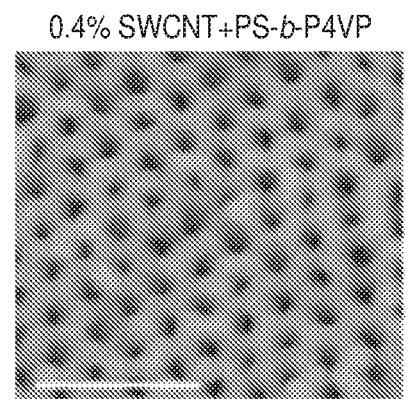
Figure 7D:
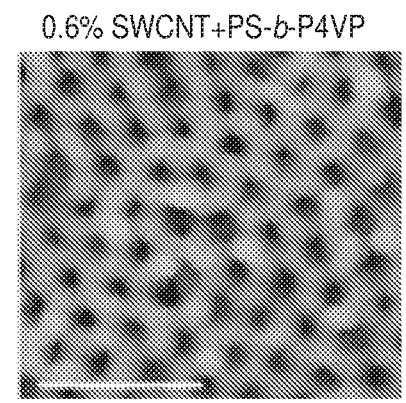

The films were fabricated through two simple steps (FIG. 5). First, about 1% CNTs (wt/wt w.r.t PS-b-P4VP) were dispersed in a 1:1:1 wt % ternary mixture of DMF-THF-Dioxane by sonication for about 1 h in an ultrasound bath. About 16.6% PS-b-P4VP was dissolved in the CNT mixture by continuous stirring for about 24 h at room temperature (RT). The mixture was then cast onto a glass plate using a casting knife with gate height of about 200 μm. The solvent was partially evaporated for about 10 s, and the film was immersed in a water bath at about RT. The film was taken out and stored in DI water for about 24 h to remove traces of solvent. In some cases, the films showed isoporous morphology up to about 1% CNT concentration, above this concentration films could not be obtained due to increase in viscosity.

Preparation of PS-co-P2VP-CNT Films

About 1% SWCNT (wt/wt w.r.t PS-co-P2VP) was dispersed in 1:1:1 wt % ternary mixture of DMF-THF-Dioxane and then sonicated in bath sonicator for about 1 h at about 40 KHz. After that, about 16.6 wt % PS-co-P2VP was dissolved in the CNT mixture by continuous stirring for about 24 h at about ambient temperature. The CNT-PS-co-P2VP solution was then spread onto glass plate using casting knife with about 200 μm gate height. The cast solution was left at about RT for about 10 s, and immersed in water bath. The film was kept in DI water for about 24 h and thoroughly washed with water for solvent removal. The film was dried and used for device fabrication and detailed sensor performance evaluation.

Preparation of CNT Films

About 16 mg CNTs were dispersed in about 500 mg THF solution under ultra-sonication for about 30 min. The well-dispersed CNT solution was then drop-cast on a non-conducting glass surface and kept under vacuum at about 50° C. for about 8 h.

Characterization

Field emission scanning electron microscopy (FESEM) was obtained using FEI Quanta 200, at an accelerating voltage of 30 kV with varied magnifications. Atomic force microscopy analysis was done with ICON Veeco in the resonance frequency range of 76-263 kHz under tapping mode. About 100 nm ultrathin sections of the film were prepared using an ultramicrotome (Leica EM UC6) and placed on a 180-mesh copper grid. They were imaged with a Titan FEI transmission electron microscope (TEM). The praying mantis accessory for solid sample mounted on Cary 5000 double beam, double monochromator spectrophotometer was used for UV-vis-NIR diffuse reflectance spectroscopy (DRS) measurements. Raman spectra were collected with 633 nm laser using a Thermo Fisher Scientific DXR Raman microscope.

X-Ray Photoelectron Spectroscopy

XPS analysis was conducted by using Kratos Axis Ultra DLD spectrometer (Kratos Analytical Ltd, UK) equipped with a monochromated Al Kα X-ray source (1486.6 eV) and hemispherical analyzer with a resolution from 0 to 0.5 eV. All spectra were recorded at an aperture slot of 700×300 μm.

Pure Water Flux Measurement and Antifouling Performance

The pure water flux of the membranes was measured using a stirred dead-end ultrafiltration cell (Amicon 8010, Millipore Co., USA) at 0.5 bar feed pressure. The ultrafiltration cell was connected to a reservoir of 1 L capacity, which was pressurized by $N_2$ gas from a cylinder. A circular piece of the membrane (25 mm diameter) was fixed in the cell and DI water was then passed for about 15 min at about 0.5 bar feed pressure. The weight of the collected DI water was measured on a digital balance (Metteler Toledo Inc., UK). The water flux was calculated as follows:

$$Jw = V/A \times t$$

where V is the volume of DI water (L), t is the permeation time (h) and A is the membrane area.

Water Vapor Sorption

Water vapor sorption experiments for the block copolymer was conducted at about 25° C. using a gravimetric sorption balance method on VTI-SA sorption analyzer from TA instruments, USA. Once the mass uptake reached equilibrium for a given activity, the system proceeded to next programmed step for activity. Equilibrium was considered when the mass uptake reached below a threshold limit (0.001% mass change in 120 min) over a specified time interval. The sample was dried inside the sorption analyzer chamber at 60° C. for 2h prior to the measurements to achieve a constant weight.

Sensor Fabrication and Measurement

The prepared films were cut into pieces of required dimensions for the sensor fabrication. A two terminal planar sensor was fabricated by depositing gold as electrode through a shadow mask using magnetron sputtering. The channel length and width of the sensor was about 50 and about 1000 μm, respectively. A custom-made set up was used for the humidity testing. The set up was equipped with a commercial standard sensor to monitor the level of humidity during the measurements. For CNT only devices, gold electrodes were deposited on drop-casted CNTs on glass. The sensor was connected to a semiconductor analyzer (Keithley 4200) for data acquisition by monitoring the change in the film conductivity under different humidity levels. Dry and pure $N_2$ was used as the carrier gas and for purging the testing chamber. Controlled level of humidity was introduced into the testing chamber by employing a bubbler placed on a hot plate, containing water connected to $N_2$ carrier gas. Then the sensor response at desired humidity levels was measured by recording current-voltage characteristics of the sensor. The sensor response for dry $N_2$ (without introducing humidity) was taken as the reference. For volatile gases, desired levels of gases were introduced into the chamber using a flow meter and the response was recorded as described previously.

Discussion and Results

Isoporous films were obtained using a straightforward method that combined block copolymer (BCP) self-assembly and non-solvent induced phase separation (SNIPS) for manufacturing highly ordered porous films. BCP-derived isoporous films have interested researchers in recent years due to their uniform porosity, but its applications were mainly restricted to separation.

Development of a simple and scalable sensor device based on isoporous films could be a rational design to realize the full potential of these films in vapor sensing. However, such non-conductive polymer-based devices suffer from low sensitivity due to its inherently insulating nature, impeding detailed exploration of such films for sensing application. To overcome the aforementioned issue, a promising route was to create hybrid/composite device by simple solution mixing of a functional material with a polymer matrix.

Compared to other fillers, by considering its merits, CNTs are a promising functional material due to a unique combination of their one-dimensional structure and high surface-to-volume ratio resulting in extraordinary electronic properties. Attempts have been made to fabricate hybrid sensors built on conjugated/non-conducting polymers and CNT where charge transfer by gas absorption around the percolation threshold provided the basis for conductivity change. However, low surface area, poor environmental stability and ambiguity about exact location of the percolation threshold area in such non-porous films or sensor remained subject of major concern hindering the growth of high-performance polymer-CNT sensors. Keeping all these issues in perspective, as described herein, 1D nanotubes especially CNTs embedded into the nanostructured isoporous films advanced sensor technologies as a result of the synergetic combination of these two highly functional components. To pursue this new film design, the SNIPS method was extended to fabricate a hybrid isoporous film containing a random network of CNTs, targeting vapor sensing for humidity and selective volatile organic compounds (VOCs). By using this approach, a highly porous sensor with sub-second response time for humidity sensing was fabricated, which is in par with the fastest devices reported previously. Moreover, device fabrication method overcame issues like aggregation and undesired alteration in properties of CNTs. It is believed that this is the first report of a defect-free, self-standing, isoporous film for humidity and VOC sensing.

Figure 8B:
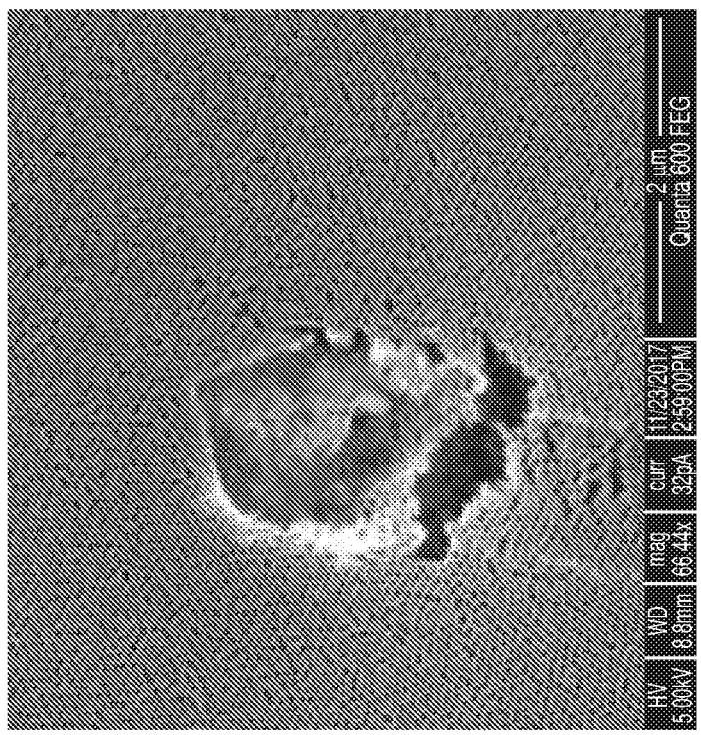
FIGS. 8A-8B are SEM images of CNT-PS-b-P4VP films with 2% w/w concentration of CNTs, according to one or more embodiments of the present disclosure.
Figure 8A:
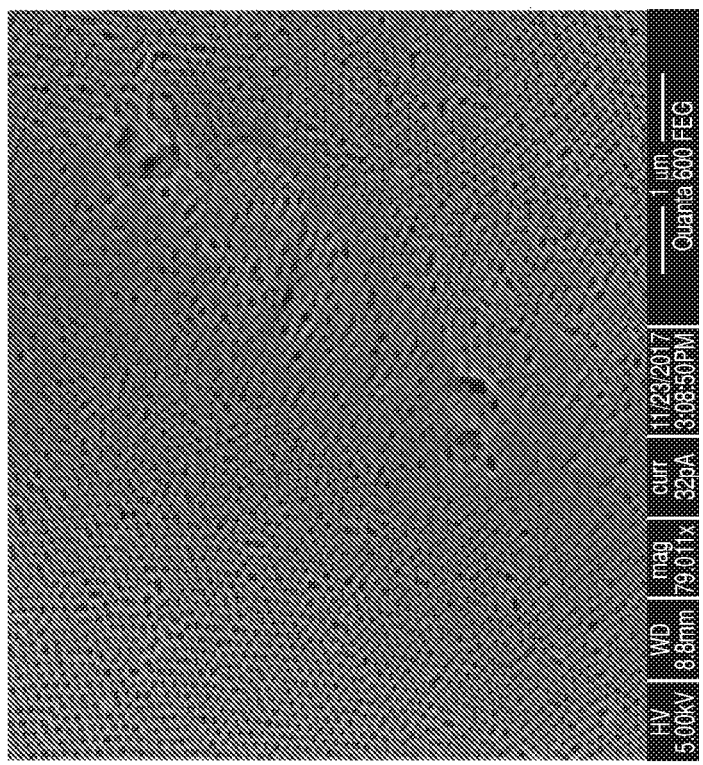
Figure 9A:
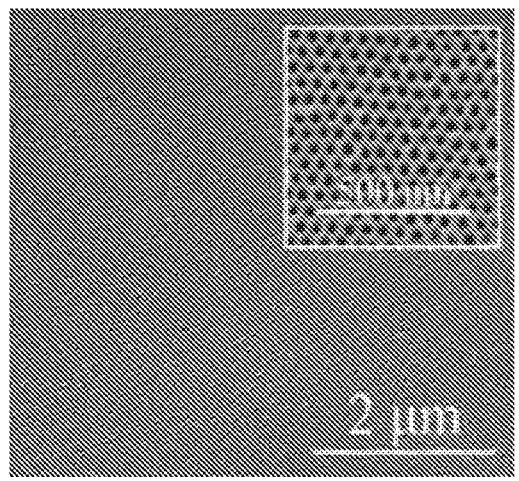
FIGS. 9A-9B relate to the characterization of CNT-PS-b-P4VP films showing (A) a top surface and (B) cross-sectional SEM images of the CNT-PS-b-P4VP films, according to one or more embodiments of the present disclosure.
Figure 9B:
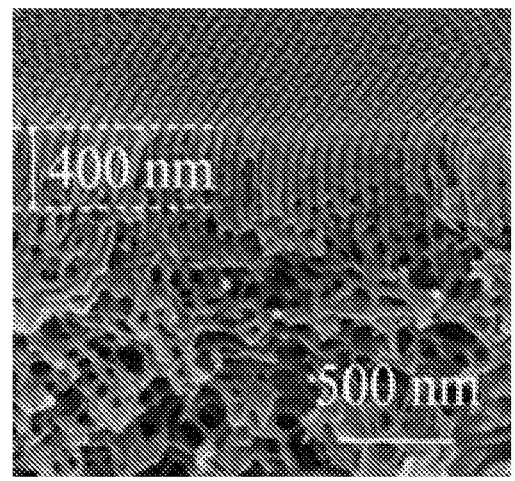
Figure 10:
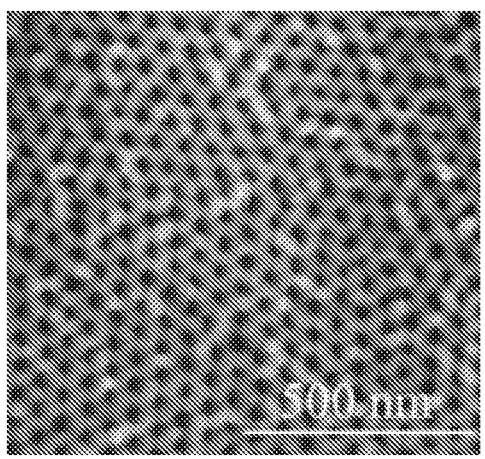
FIG. 10 relates to the characterization of CNT-PS-b-P4VP films showing an AFM image of the film surface, according to one or more embodiments of the present disclosure.
Figure 11:
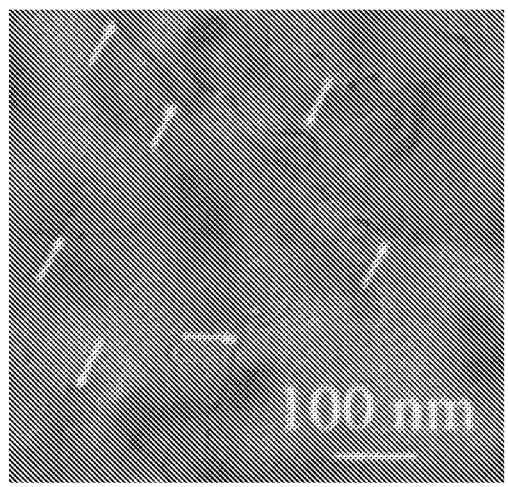
FIG. 11 relates to the characterization of CNT-PS-b-P4VP films showing a high magnification TEM image, and the arrows denote the random CNT network, according to one or more embodiments of the present disclosure.

Polystyrene-b-poly(4-vinyl pyridine) (PS-b-P4VP) isoporous films containing CNTs were fabricated by a two-step strategy (FIG. 5). First, the homogenously dispersed solution of CNT was prepared in a ternary solvent mixture, and then PS-b-P4VP was added, which afforded an isoporous film-forming matrix. The viscous solution was cast on a glass surface where the solvent from the "protofilm" was then partially evaporated for about 10 s, leading to an increase in CNT-PS-b-P4VP concentration at the air/solution interface. This triggered the formation of a nanostructured isoporous matrix on the skin-layer of the film, which was kinetically entrapped by immersion in a precipitation bath. Key parameters like CNT content, polymer concentration, solvent ratio, and evaporation time were optimized to achieve highly dense nanochannels with uniform pore morphology on the film surface. The resulting structure included uniformly distributed CNTs in the film with vertically aligned nanochannels of ~400 nm length and ~20 nm diameter supported by a sponge-like open sublayer. In some cases, the films exhibited isoporous morphology up to about 1% (w/w) CNT concentration (FIGS. 6A-6D, 7A-7D), above which serious local agglomerations due to enhanced van der Waals interaction between side-walls of the nanotubes resulted in films with defective morphology (FIGS. 8A-8B). Hereafter, if not specified, CNT-PS-b-P4VP refers to films with 1% CNT content. As evident from scanning electron microscopy (SEM) images, no defects were observed in the film up to 1% (w/w) CNT concentration, suggesting uniform dispersion of CNTs in the BCP matrix (FIGS. 9A-9B). This can be attributed to the favorable interaction between polymer and CNT. The π-π interaction between the pyridyl groups of P4VP and sidewalls of CNT stabilize the dispersion, thus preventing aggregation of CNTs. The atomic force microscopy (AFM) images confirmed the long-range isoporous morphology of the film consistent with the SEM images (FIG. 10). Moreover, transmission electron microscopy (TEM) images provided further insights into the microstructure of the film (FIG. 11). It was revealed that the BCP matrix uniformly embedded the fragments of CNTs without agglomeration, crucial for effectively conserving the aspect ratio as well as the 1D characteristic of nanotubes, which enhanced the electrical conductivity of the film.

Figure 12:
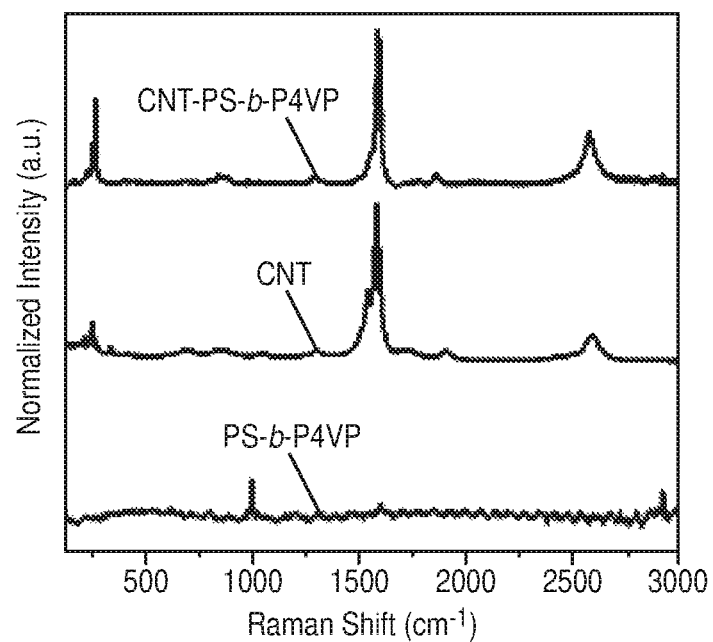
FIG. 12 relates to the characterization of CNT-PS-b-P4VP films showing Raman spectra for pristine and CNT-PS-b-P4VP films, according to one or more embodiments of the present disclosure.
Figure 13:
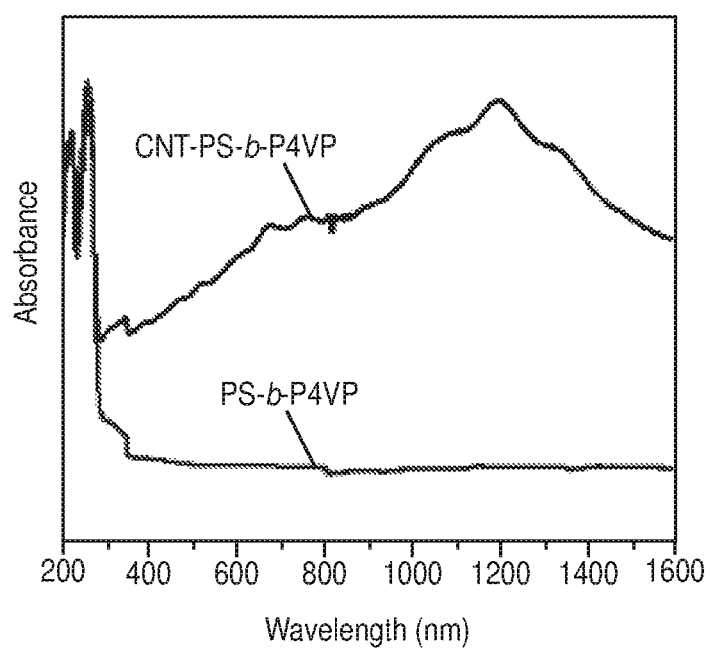
FIG. 13 relates to the characterization of CNT-PS-b-P4VP films showing solid-state UV-vis-NIR spectra for pristine and CNT-PS-b-P4VP films, according to one or more embodiments of the present disclosure.
Figure 14:
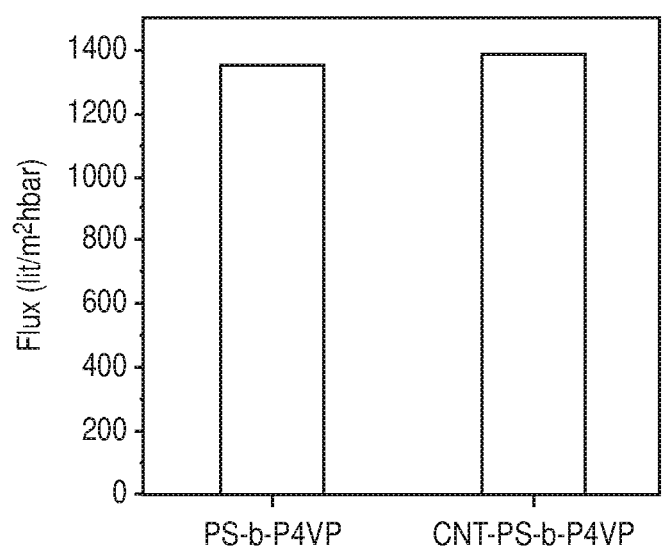
FIG. 14 is a graphical view illustrating the pure water flux of isoporous films at 1 bar feed pressure with a stirring speed of 400 rpm, according to one or more embodiments of the present disclosure.

Raman spectra of CNT-PS-b-P4VP indicated that the properties of the CNTs were well preserved after being embedded in the BCP matrix (FIG. 12). The diameter of nanotubes was between about 0.89-1.1 nm, as indicated by the radial breathing mode (RBM) of CNTs which was between about 100-300 $cm^{-1}$. The G band peak at 1588 $cm^{-1}$ comprised of $G^-$ and $G^+$ bands, besides the narrow and low intensity of $G^-$ peak indicated the presence of both metallic and semiconducting nanotubes. FIG. 13 represents the solid-state UV-vis-NIR absorption traces of pristine and CNT embedded films. The bands from 800-1600 nm slightly overlapping with bands between 550-900 nm symbolized the $E_{11}$ and $E_{22}$ transitions associated with van Hove singularities arising due to one-dimensionality of semiconducting CNTs, whereas metallic nanotubes were responsible for the low energy bands from 400-600 nm. Overall, these observations validated the presence of CNTs on the skin-layer of the isoporous film. Furthermore, pure water filtration studies demonstrated similar water fluxes between PS-b-P4VP and CNT-PS-b-P4VP films, revealing pore-size uniformity and ascertaining no pore blockages after embedding CNT in the polymer matrix (FIG. 14).

Figure 15A:
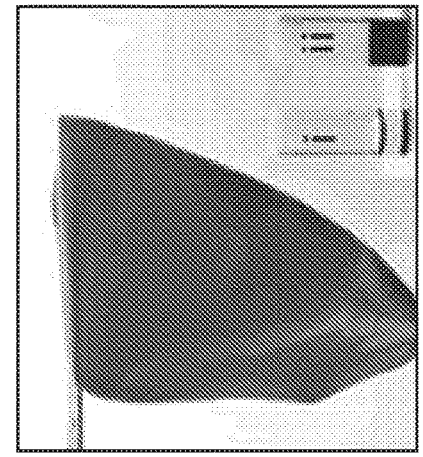
FIGS. 15A-15F show (A) a photograph of the as-prepared self-standing CNT-PS-b-P4VP film, with an inset showing the pristine CNT (i) and PS-b-P4VP stabilized CNT (ii) solutions; (B) a schematic diagram of the device architecture; (C) a graphical view of I-V curves for PS-b-P4VP films with and without CNT under dry conditions; (D) a graphical view of I-V response curves of the CNT-PS-b-P4VP sensor to RH ranging from 10% to 95%; (E) a graphical view of a sensitivity change of CNT-PS-b-P4VP sensor as a function of RH; and (F) a graphical view of adsorption-desorption behavior of the CNT-PS-b-P4VP sensor, with an inset showing an array of sensors fabricated on CNT-PS-b-P4VP film, according to one or more embodiments of the present disclosure.
Figure 15C:
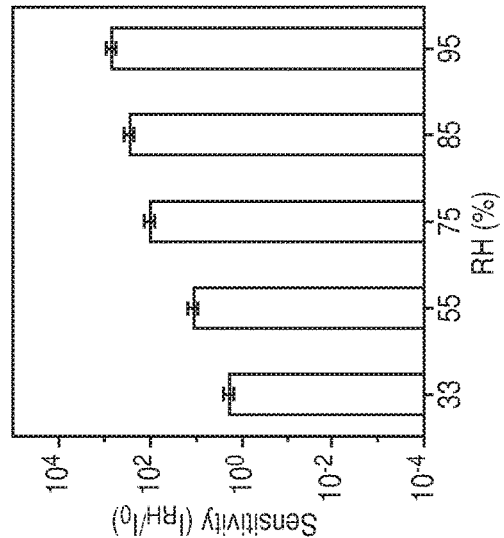
Figure 15E:
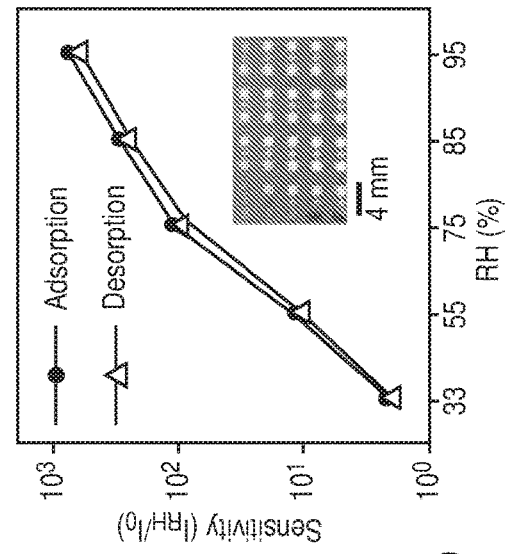
Figure 15B:
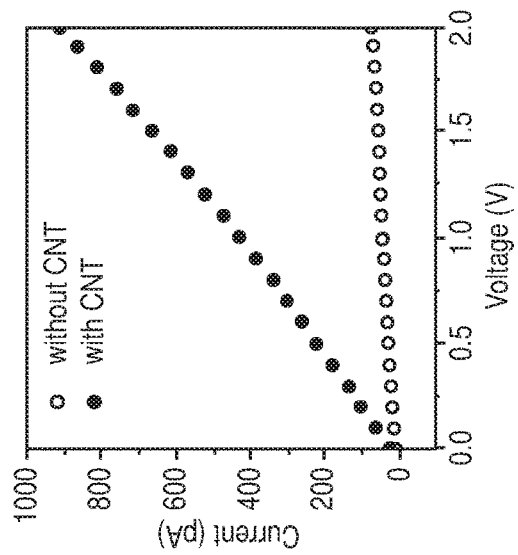
Figure 15D:
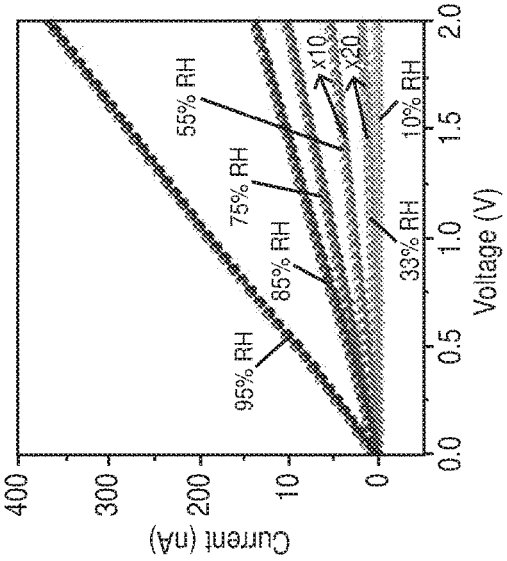
Figure 15F:
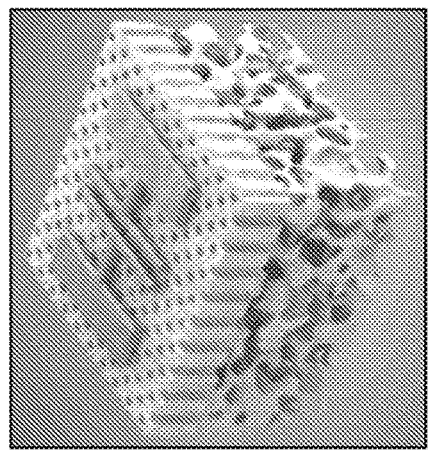
Figure 16:
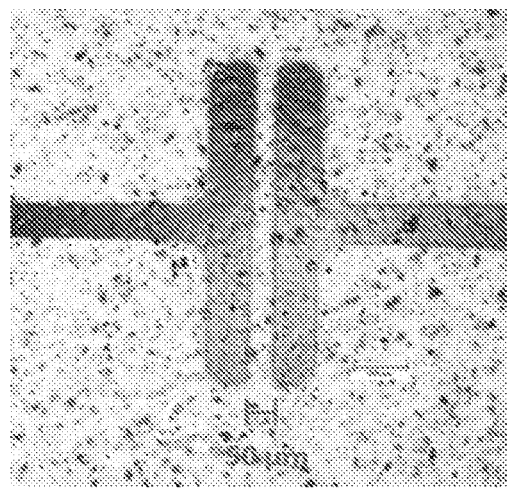
FIG. 16 is an optical image of the sensor, according to one or more embodiments of the present disclosure.
Figure 17:
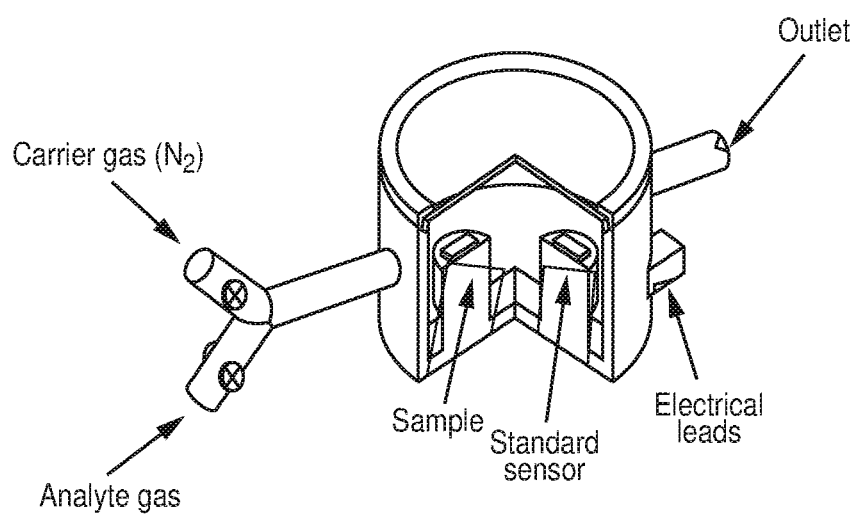
FIG. 17 is a schematic diagram of the humidity testing set up, according to one or more embodiments of the present disclosure.
Figure 18:
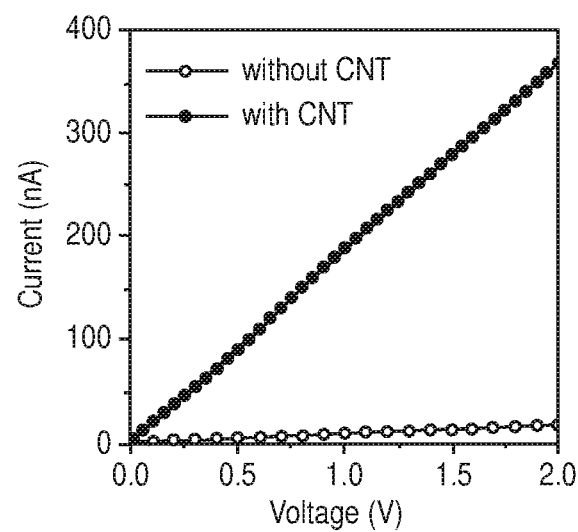
FIG. 18 is a graphical view of the response of CNT-PS-b-P4VP and pristine PS-b-P4VP sensor under 95% RH, according to one or more embodiments of the present disclosure.
Figure 19A:
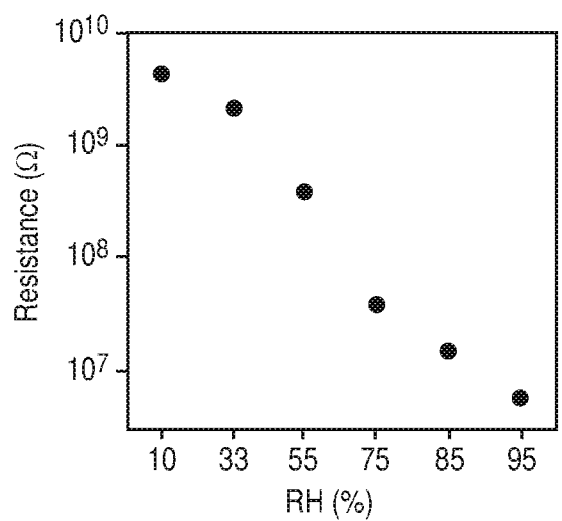
FIGS. 19A-19B are graphical views showing (A) CNT-PS-b-P4VP sensor resistance as a function of relative humidity; and (B) weight change as a function of RH for CNT-PS-b-P4VP film at 25° C., according to one or more embodiments of the present disclosure.
Figure 19B:
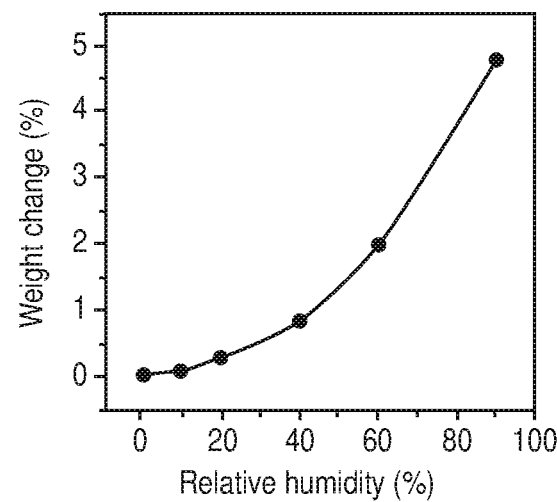

One of the advantages of SNIPS derived films was formation of self-standing films (FIGS. 15A-15F) with highly porous morphology, leading to rapid absorption/desorption of vapors, which made them particularly attractive for sensing applications. Remarkably, the CNT-PS-b-P4VP formed stable homogenous solution by gentle stirring where CNT remained well dispersed under static condition even after 7 days without any observable agglomeration. In contrast, pristine CNTs rapidly settled within hours in the ternary solvent mixture under similar conditions (FIG. 15A (inset)). FIG. 15B shows the device architecture of the sensor, which consists of two gold electrodes deposited onto the film surface (optical image of the actual device shown in FIG. 16). First, to determine the effect of CNT addition on the electrical property of PS-b-P4VP, the resistance of PS-b-P4VP and CNT-PS-b-P4VP films was measured in dry environment. A significant decrease in the resistance of CNT-PS-b-P4VP films as a result of CNT embedding was observed (FIG. 15C). The change in the electrical resistance of the sensing element in response to its surrounding environment is the principle underlying chemiresistive sensors. A custom-designed set up was used to carry out the sensor testing under various relative humidity (RH) levels (FIG. 17). Nitrogen ($N_2$) was employed as the carrier gas and for purging the chamber. The sensor response, which was essentially the change in its conductance, was monitored in real time by recording current-voltage (I-V) characteristics of the sensor. Initial sensor tests revealed that the CNT-PS-b-P4VP sensors notably outperformed the pristine PS-b-P4VP sensors (FIG. 18). Therefore, this work primarily focused on exploring the sensing capabilities of CNT-PS-b-P4VP films. The I-V curves for the CNT-PS-b-P4VP sensor under different RH levels (10%-95%) at room temperature are presented in FIG. 15D. The linearity of the I-V curves confirmed a good ohmic contact between the gold electrode and film surface. It was clear that the resistance of the sensor decreased with increasing humidity levels. The sensitivity of the sensor was calculated as $I_{RH}/I_0$, where $I_{RH}$ is the current under a given RH and I¬0 is the current in dry $N_2$. Sensitivity values were calculated for different humidity levels (FIG. 15E) from I-V curves at a potential bias of 2 V (current value for 10% RH was taken as $I_0$). The sensitivity exhibited exponential change of ~800 on changing humidity from 10% to 95%. The corresponding sensor resistance at 95% RH (~5.5×10⁶Ω) was ~820 times lower than that (~4.5×10⁹Ω) at 10% RH (FIG. 19A). It was apparent that the resistance change of the sensor was co-related to the orderly water vapor uptake by the nanoporous polymer matrix (FIG. 19B). In addition, the sensitivity curve for adsorption and desorption exhibited negligible hysteresis, indicating good reliability of the sensor and low vapor residence time. (FIG. 15F). It was noteworthy that due to the miniaturized size of the present sensors, arrays of such sensors can be fabricated on a small piece of film (FIG. 15F (inset)).

Figure 21:
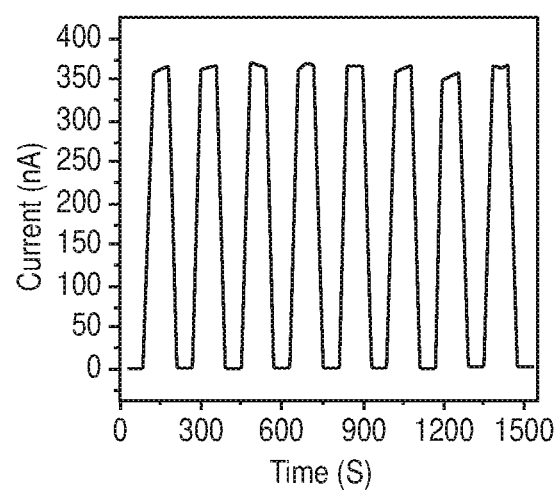
FIG. 21 is a graphical view of a I-t plot for multiple cycles of humidity switching between 10% and 95%, according to one or more embodiments of the present disclosure.

One of the most important parameters of a sensor is its detection speed. The response time of the CNT-PS-b-P4VP sensor was measured to be 0.3 s when exposed to 95% RH from 10% RH, while the recovery time was ~4 s. (FIG. 20A). The response and recovery speed of the CNT-PS-b-P4VP sensors were ~13 and ~3 times, respectively, faster than pristine PS-b-P4VP sensors (FIG. 20B), underpinning the importance of CNT inclusion into film matrix. The response and recovery time of the present CNT-PS-b-P4VP sensor was one of the best among the reported literature to date (Table 1). In particular, the fast response time implied speedy charge separation and efficient extraction due to improved conductivity with CNTs. Next, to check the reproducibility and stability, the sensor response was recorded under high humidity (95% RH) for ~2500 s (FIG. 20C) and by repeated exposure/purging (FIG. 21). The CNT-PS-b-P4VP sensor exhibited excellent performance under prolonged humidity exposure without any performance degradation, indicating the robust nature of the present sensors.

Figure 22:
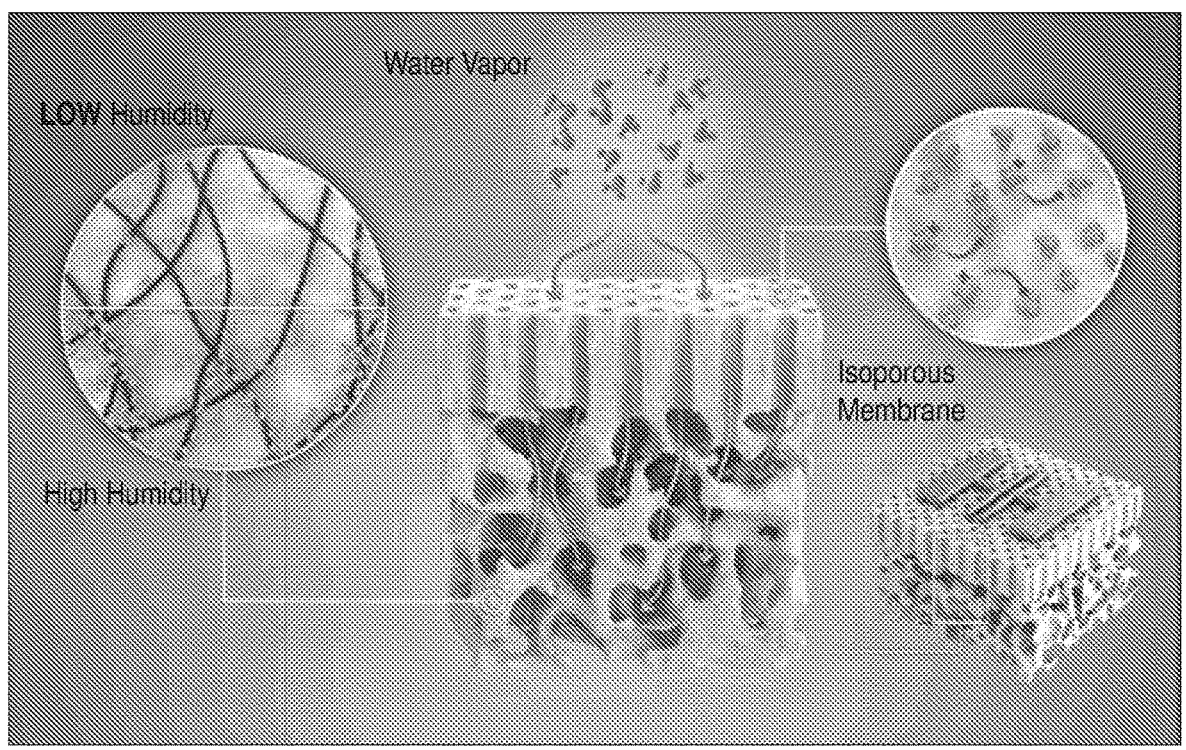
FIG. 22 is a schematic diagram of the sensing mechanism of CNT-PS-b-P4VP film-based chemiresistive sensor, according to one or more embodiments of the present disclosure.
Figures 23A, 23B, 23C:
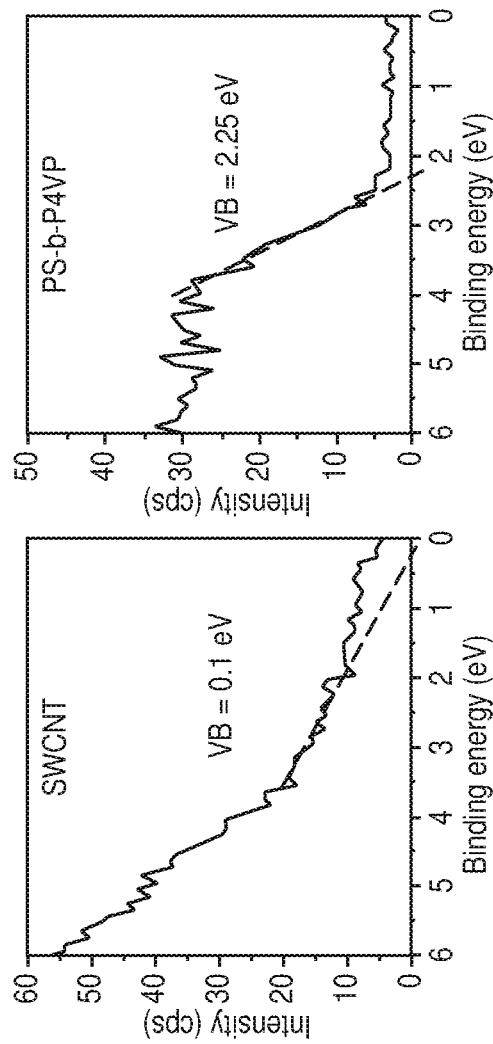
FIGS. 23A-23C is a graphical view and schematic diagram showing XPS valence band spectra for (A) SWCNT (B) PS-b-P4VP, and (C) Band alignment between CNT and PS-b-P4VP, where X-ray photoelectron spectroscopy (XPS) of pristine CNT and PS-b-P4VP was carried out to determine the valence band (VB) edge with respect to fermi level (FIGS. 25A-25B) and the conduction band edge was calculated by adding the VB edge from XPS and bandgap from absorption measurements, revealing the band alignment between CNT and PS-b-P4VP which is more favorable for electron transfer from PS-b-P4VP to CNT (FIG. 21C), according to one or more embodiments of the present disclosure.
Figure 24B:
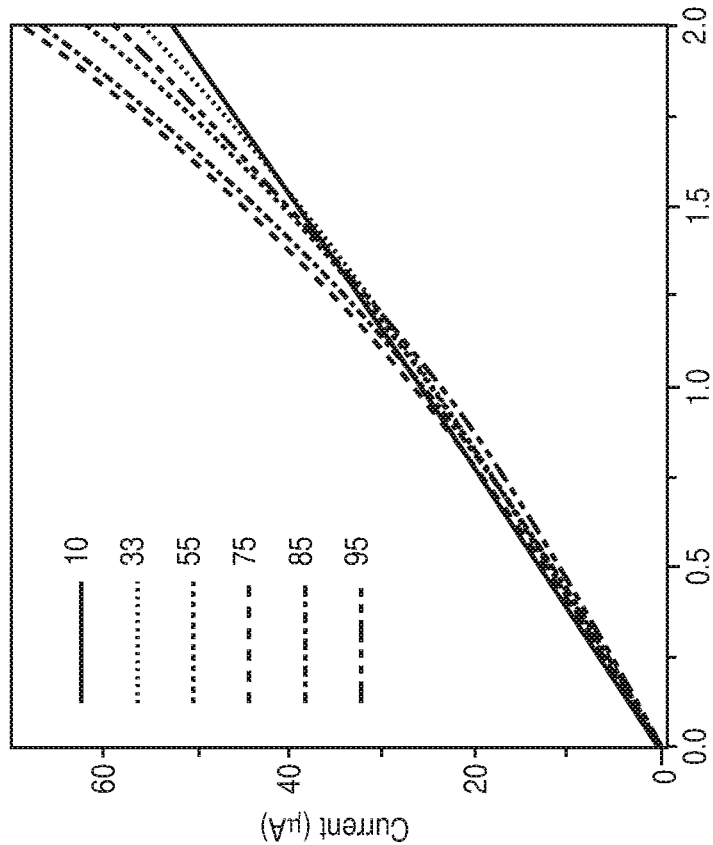
FIGS. 24A-24B is an (A) SEM image of drop-casted CNT film and (B) a graphical view of I-V response curves of the CNT sensor to RH ranging from 10% to 95%, according to one or more embodiments of the present disclosure.
Figure 24A:
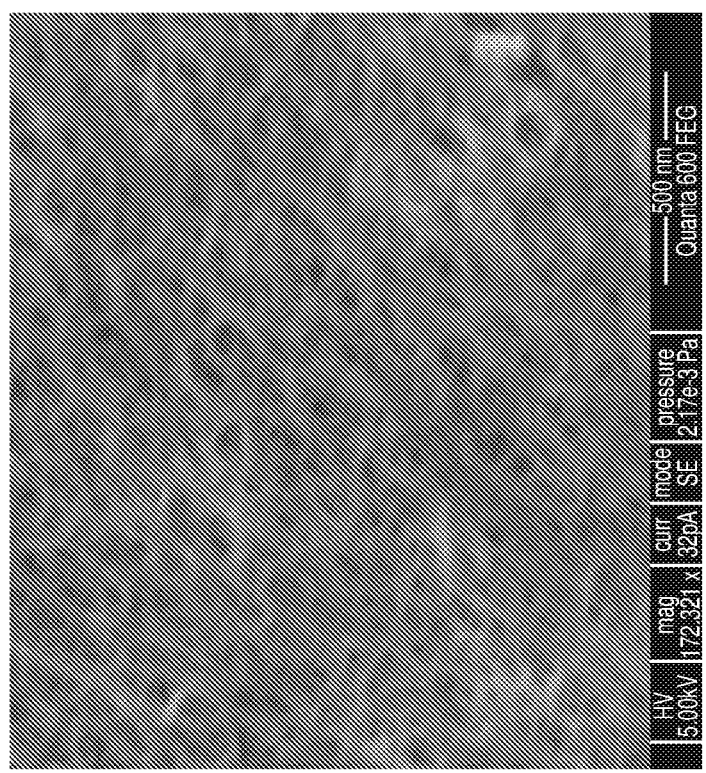

The sensing mechanism of the present sensor is schematically represented in FIG. 22. The change in resistance with RH can be ascribed to the interplay of two mechanisms. First, the change in conductivity arose due to protons hopping through the aquatic layers condensed on the surface of the sensor via the Grotthus mechanism. Second, there was electron transfer from the polymer matrix to CNTs as revealed by the band alignment between CNT and PS-b-P4VP (more details in FIGS. 23A-23C). In addition, the lone pair of electrons from the exposed vapors interacted with the CNT surface and transferred electrons to CNT, further enhancing the conductivity of the sensor and implying that protonic coupled with electronic conduction was the dominant mechanism in case of CNT-PS-b-P4VP sensors. This was consistent with the observations that pristine PS-b-P4VP sensors had lower sensitivity and were significantly slower compared to CNT-PS-b-P4VP. Humidity sensors with only CNTs were also fabricated and found that the resistance change was minor which first decreased and then increased with humidity change (FIGS. 24A-24B). This was attributed to the low cross-linking of CNTs. These studies highlighted that the primary role of CNTs was to efficiently extract the carriers and enhance the charge transport in CNT-PS-b-P4VP sensors.

Figure 25B:
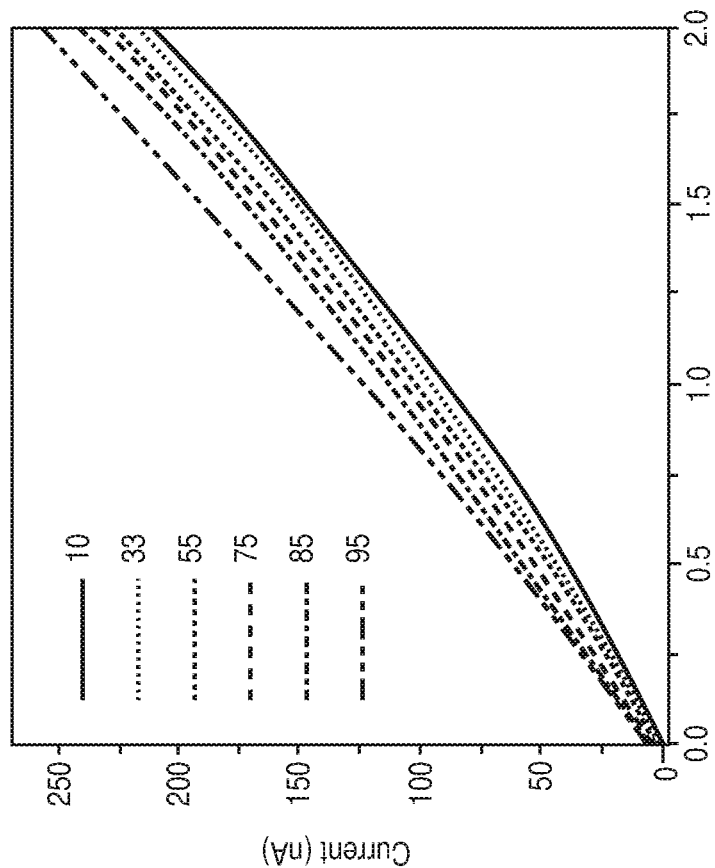
FIGS. 25A-25B is an (A) SEM image of CNT-PS-co-P2VP film and (B) a graphical view of I-V characteristics under different humidity levels for the sensor fabricated on commercial film, according to one or more embodiments of the present disclosure.
Figure 25A:
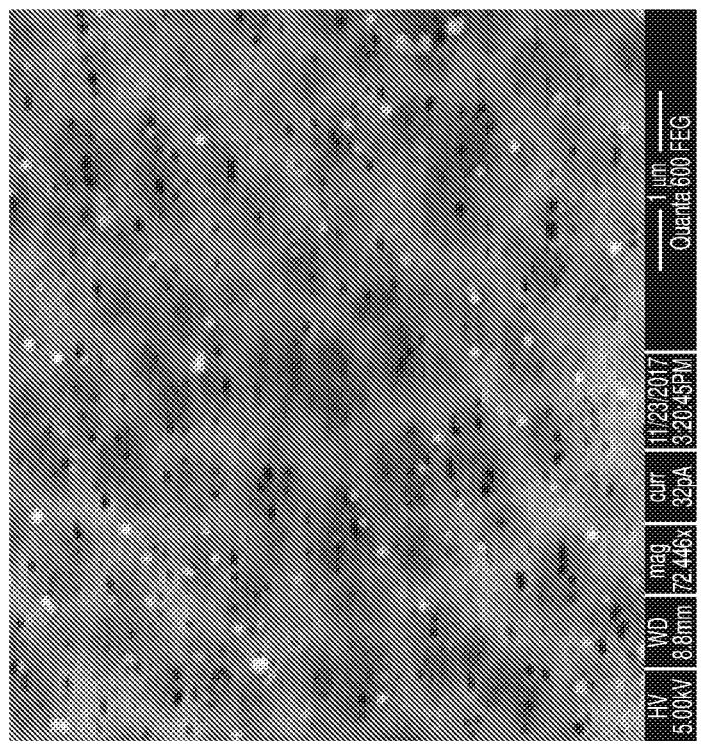

FIGS. 25A-25B is an (A) SEM image of CNT-PS-co-P2VP film and (B) a graphical view of I-V characteristics under different humidity levels for the sensor fabricated on commercial film, according to one or more embodiments of the present disclosure.

Figure 26:
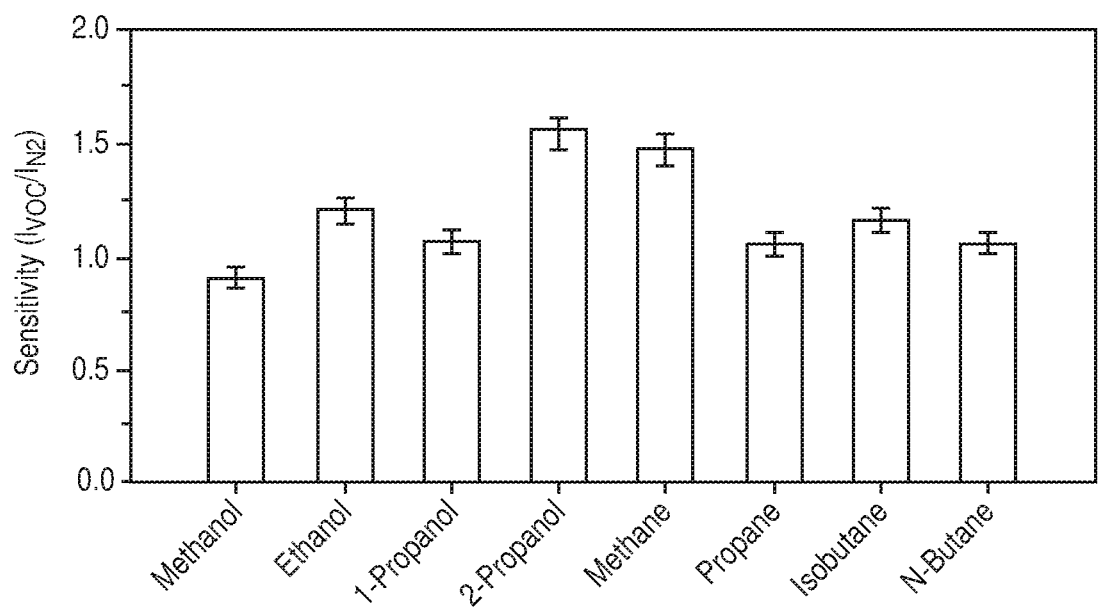
FIG. 26 is a graphical view showing sensitivity of CNT-PS-b-P4VP sensor for various VOCs and gases, according to one or more embodiments of the present disclosure.

FIG. 26 is a graphical view showing sensitivity of CNT-PS-b-P4VP sensor for various VOCs and gases, according to one or more embodiments of the present disclosure.

In conclusion, CNT-embedded isoporous PS-b-P4VP films for chemiresistive sensing as described herein overcame challenges of fabrication of well-defined and long-range porous devices using SNIPS. CNT inclusion and uniform pore distribution of the film resulted in efficient detection of humidity and organic vapors. In particular, CNT embedded films exhibited fast response and recovery times for humidity detection due to fast charge collection in contrast to pristine films. In addition to CNTs, the incorporation of other materials such as carbon fibers, quantum dots, metal particles and graphene may lead to isoporous films with interesting properties. The facile approach of fabricating such isoporous films opens new avenues for further exploration of this class of films for functional devices.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

TABLE 1

Summary of Related Humidity Sensors Based on Polymer and Other Materials

| S.N. | Material | Response Time (s) | Recovery Time (s) | RH range (%) |
|---|---|---|---|---|
| 1 | CdS nanoparticles | 60 | 30 | 17-85 |
| 2 | Au/Pd nanofibers | >60 | >300 | 11-94 |
| 3 | ZnO nanocrystals | 50 | 6 | 5-85 |
| 4 | CuO/ZnO nanocorals | 6-7 | 7 | 33-90 |
| 5 | Porous $TiO_2$ | 5 | 8 | 11-95 |
| 6 | $Al_2O_3$ | 10 | 20 | 11-95 |
| 7 | Na—ZnO nanofiber | 3 | 6 | 11-95 |
| 8 | Polyaniline nanofibers | 8 | 6 | 11-98 |
| 9 | Cross-linked polyelectrolyte derivatives | 175 | 125 | 20-95 |
| 10 | Sulfonated polystyrene | 30 | 300 | 25-95 |
| 11 | $TiO_2$ incorporated sulfonated polystyrene | 2 | 20 | 11-95 |
| 12 | Sulfonated polyimides | 60 | 240 | 30-90 |
| 13 | Au nanorod embedded polymer nanofibers | 0.11 | 0.11 | 30-71 |
| 14 | Cholesteric liquid crystals | 120 | 120 | 3-80 |
| 15 | Fluorophore in hydrogels | >10 | >1200 | 0-100 |
| 16 | Magnetic polymer gel photonic crystals | >100 | 110 | 11-97 |
| 17 | Nanoporous polymeric photonic crystals | 1.5 | >20 | 40-95 |
| 18 | Sulfonated block copolymers | 2 | 5 | 15-95 |
| 19 | LiCl doped $TiO_2$ nanofiber | >3 | <7 | 11-95 |
| 20 | Isoporous SWCNT-PS-b-P4VP films (present disclosure) | 0.3 | ~4 | 10-95 |

What is claimed is:

1. A method of detecting one or more chemical species, comprising:
    exposing a sensor to an environment, wherein the sensor includes a composite material with functional materials embedded in an isoporous block copolymer film, wherein the isoporous block copolymer film includes a block copolymer having a molecular weight in the range of about 50 kDa to about 200 kDa; and
    detecting a presence of one or more chemical species in the environment.

2. The method of claim 1, wherein the functional materials include one or more of carbon nanoparticles, carbon fibers, quantum dots, metal particles, and graphene.

3. The method of claim 1, wherein the functional materials are single-walled carbon nanotubes and the isoporous block copolymer film is an isoporous PS-b-P4VP film, wherein the single-walled carbon nanotubes are embedded in the isoporous PS-b-P4VP film.

4. The method of claim 1, wherein a relative humidity of the environment ranges from about 10% relative humidity to about 95% relative humidity.

5. The method of claim 1, wherein the chemical species is one or more of water vapor and one or more volatile organic compounds.

6. The method of claim 1, wherein detecting includes measuring a change in resistance of the film.

7. The method of claim 1, wherein the resistance of the film changes in response to the absorption and/or desorption of one or more chemical species.

8. The method of claim 1, wherein the isoporous block copolymer film includes a block copolymer including one or more of polystyrene, poly-4-vinylpyridine, poly-2-vinylpyridine, polybutadiene, polyisoprene, poly(ethylene-stat-butylene), poly(ethylene-alt-propylene), polysiloxane, polyalkyleneoxide, poly-ε-caprolactone, polylactide, polyalkylmethacrylate, polymethacrylic acid, polyalkylacrylate, polyacrylic acid, polyhydroxyethylmethacrylate, polyacrylamide, poly-N-alkylacrylamide, polysulfone, polyaniline, polypyrrole, polytriazole, polyvinylimidazole, polytetrazole, polyethylenediamine, polyvinylalcohol, polyvinylpyrolidone, polyoxadiazole, polyvinylsulfonic acid, polyvinylphosphonic acid, and polymers with quarternary ammonium groups.

9. A method of detecting a chemical species, comprising:
    sorbing one or more chemical species onto a sensor, wherein the sensor includes a composite material with CNTs embedded in an isoporous block copolymer film, and wherein the isoporous block copolymer film includes a block copolymer having a molecular weight in the range of about 50 kDa to about 200 kDa; and
    measuring a change in an electronic property of the sensor.

10. The method of claim 9, wherein the chemical species is one or more of water vapor and one or more volatile organic compounds.

11. The method of claim 9, wherein the electronic property includes one or more of impedance, resistance, and capacitance.

12. The method of claim 9, wherein a resistivity of the sensor decreases with increasing humidity levels.

13. The method of claim 9, where a response time of the sensor is less than about 1 s.

14. The method of claim 9, wherein a recovery time of the sensor is less than about 10 s.

15. A sensor, comprising:
    a first electrode;
    a second electrode; and
    a composite material, wherein the composite material comprises an isoporous block copolymer film and a plurality of carbon nanotubes embedded in the film, and wherein the isoporous block copolymer film includes a block copolymer having a molecular weight in the range of about 50 kDa to about 200 kDa;
    wherein the first electrode and the second electrode are deposited on a surface of the composite material.

16. The sensor of claim 15, wherein the first electrode and second electrode are interdigitated.

17. The sensor of claim 15, wherein the sensor detects one or more of a presence of one or more chemical species and an amount of one or more chemical species.

18. The sensor of claim 15, wherein the sensor is a chemiresistive sensor.

19. The sensor of claim 15, wherein one or more of the first electrode and second electrode include one or more of gold, chromium, titanium, and aluminum.

* * * * *